United States Patent [19]

Livanos

[11] Patent Number: 5,068,892
[45] Date of Patent: Nov. 26, 1991

[54] ROUTE BASED NETWORK MANAGEMENT

[75] Inventor: Konstantin Livanos, Naperville, Ill.

[73] Assignee: AT&T Bell Laboratories, Murray Hill, N.J.

[21] Appl. No.: 429,662

[22] Filed: Oct. 31, 1989

[51] Int. Cl.[5] .......................................... H04M 7/00
[52] U.S. Cl. ..................................... 379/221; 379/220
[58] Field of Search ................. 379/220, 221, 219, 207

[56] References Cited

U.S. PATENT DOCUMENTS

| | | | |
|---|---|---|---|
| 3,536,842 | 10/1970 | Ewin et al. | 379/221 X |
| 4,704,724 | 11/1987 | Krishnan et al. | 379/221 |
| 4,744,026 | 5/1988 | Vanderbel | 379/221 X |
| 4,788,721 | 11/1988 | Krishnan et al. | 379/221 |
| 4,873,517 | 10/1989 | Baratz et al. | 379/220 X |

Primary Examiner—James L. Dwyer
Attorney, Agent, or Firm—P. Visserman; W. Ulrich

[57] ABSTRACT

Traffic measurements and network management controls are applied in an exchange in real-time on a per-route basis. Selection of an idle circuit between two exchanges is done by first selecting a route and path based on a route busy/idle status map, a source destination restriction map defining restriction on a route for certain sources, and a second connection map defining availability of a second link in a two link connection. A circuit group busy/idle map for a selected route is consulted to find an idle circuit group and finally, a circuit is selected from a circuit group which is known to have at least one idle circuit. Traffic measurements, including measurements of attempts, seizures and answers are recorded on a per-route basis with a specific indication as to the source of the traffic in the event of a direct route. Traffic measurements are also made to record traffic routed to an alternate route and the identity of the alternate route as well as traffic received as alternate route traffic from another route together with the identity of that route. Data defining routes and alternate routes which have a low completion rate are identified and network management controls are automatically applied to the routes for affected destination codes. Circuit reservation levels are defined which allow the selective control of alternate or direct traffic on a route based on the number of idle circuits in a route.

16 Claims, 16 Drawing Sheets

ROUTE PARAMETERS

CALL GAPPING LIST

ROUTE PARAMETERS

MC CONTROL BLOCK

ROUTE BASED NETWORK MANAGEMENT

CROSS-REFERENCE TO RELATED APPLICATION

This application is related to the application entitled "Telecommunications Network Route Selection" by the inventor of this application, filed concurrently herewith, and assigned to the assignee of this application.

TECHNICAL FIELD

This invention relates to telecommunications and more particularly to the control of traffic in complex telecommunications system.

BACKGROUND OF THE INVENTION

A telephone call is originated by transmitting digits, identifying a destination, to a telephone exchange. If the destination is not part of the local exchange, the call must be routed to another destination exchange, sometimes via a network of exchanges, also called nodes. Various routes may be possible between an originating node and a terminating node. An exchange generally contains data defining first choice and alternate paths for different destinations, as defined by an area code, and/or country code, and exchange code digits. Interexchange transmission facilities may consist of several circuit groups, each having a plurality of circuits, also referred to as trunks. A problem in telecommunication networks is the control of traffic flow to avoid congestion which may be caused by equipment faults or changes in call activity. Some changes in call activity can be anticipated, for example, activity levels during business hours. Other call activity may be the result of a natural disaster or other event which increases traffic in a certain area manyfold.

Prior art traffic management is predicated on traffic measurements taken at each of the circuit groups in an exchange. In the prior art, off-line systems are used to collect the activity data of the various circuit groups and the data is analyzed in order to determine the activity of a group of circuits between two exchanges in order to define overloaded routes or route with low call completion rates. Network management entails the control of a multi-node network by restricting traffic on certain routes and allowing traffic on other routes in order to prevent undue congestion. A problem of the prior art is that the control information is not available in real-time and in some cases the need for traffic rearrangement no longer exists by the time the computations have been made. Furthermore, in a system where preferred and alternate routes are allowed, a particular circuit group being analyzed may carry direct traffic from an exchange to a next exchange and alternate route traffic coming from yet another exchange and routed via this exchange to the next exchange. Typically, traffic is routed via an alternate for lack of availability of a direct route to a destination. The prior art arrangement makes no provision for distinguishing between direct route and alternate route traffic on a circuit group and where a circuit group is used for a number of different alternate routes, prior art systems may create conflicting network management data. Consequently, the prior art systems require analysis by a human expert to prevent the applications of control which would be detrimental to the operation of the network.

Another problem of the prior art is that while congestion can be detected by measurements, for example, such as those indicating incompleted calls on a circuit group and traffic can be diverted from that circuit group to another, there is no convenient way of determining when a circuit group will be ready to resume normal traffic handling. A congestion typically is due to a problem at the next node in the network or at a subsequent location. Short of periodically releasing a circuit to which management control has been applied and later analyzing if additional congestion has resulted, there is no convenient way of restoring a circuit to its normal traffic handling capacity.

SUMMARY OF THE INVENTION

In accordance with my invention, these and other problems of the prior art overcome and an advance is made by defining paths between nodes in terms of routes, with each route representing a plurality of circuit groups, by making measurements on a per route basis and automatically implementing controls in the exchange. In accordance with one aspect of the invention, if the ratio of the number of calls answered to call attempts on a route is above a certain threshold, procedures are automatically initiated to determine the identify of specific destination codes for which the bid to answer ratio is above a predefined threshold. Advantageously, the exchange collects measurements only for destination codes used on routes where problem conditions exist rather than on all destination codes as is done in the prior art. In accordance with one aspect of the invention, the exchanges stores information which allows the exchange to determine call completion for calls over alternate routes as well as direct routes.

In accordance with one specific aspect in the invention, the exchange creates a list of hard to reach (HTR) destination codes by entering every destination code offered to a route under HTR observation in an HTR list. This information is used to apply call control during call processing.

In one specific embodiment of the invention, network management is implemented by means of a well known call gapping control whereby one call is offered to a route once every predefined time. Advantageously, network management is automatically implemented when an exchange code is on the hard to reach list and the network management controls remain in effect for a predetermined number of consecutive time periods. Thereafter the control for the specific exchange code is released and is monitored for another predetermined number of consecutive intervals. If it appears that during the monitoring that further controls are needed, the controls are reapplied. When the call completion rate has been found to be normal for a predetermined number of time intervals, the destination code is removed from the list.

In accordance with one embodiment of the invention, messages are sent to proceding exchanges, i.e. exchanges from which traffic is received, to indicate hard to reach code when a request for a connection to such a code is received from that preceding exchange. This allows the preceding exchange to implement network management controls, such as allowing only a certain number of calls per a unit of time. The preceding exchange may then removed all controls if no message has been received from the exchange which previously sent the message for a predetermined number of consecutive intervals. Advantageously, this arrangement automatically activates and deactivates network management control.

In accordance with one aspect of the invention, the different levels of network management controls may be implemented. In one embodiment of the invention, a number of reservation levels are defined and certain traffic such as alternate routed traffic is controlled when the number of idle circuits in a route falls below a predetermined number. When the number of idle circuits falls below a second, lower level both a direct and alternate traffic on a route are made subject of control. When an excessive number of circuits, relative to the number of idle circuits, are occupied by incoming traffic, incoming load control may be activated to control incoming traffic from another exchange by requesting the other exchange to control its traffic on the route.

In accordance with one aspect of this invention, traffic data is collected with respect to a route include an indication of the source of a call, which may be normal telephone traffic or a special network or the like and various restrictions may be placed upon incoming call traffic, in dependence on the source designation.

BRIEF DESCRIPTION OF THE DRAWING

The invention may be better understood from the following Detailed Description when read in conjunction with the drawing, in which.

DETAILED DESCRIPTION

Figure 1:
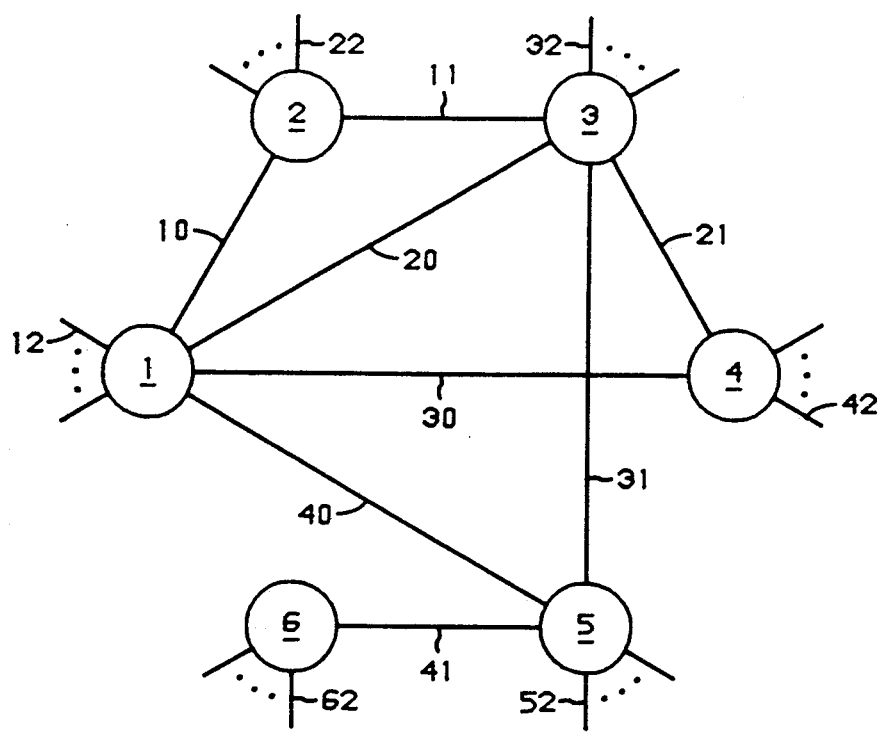
FIG. 1 is a block diagram representation of a telecommunications network comprising a plurality of interconnected nodes.

FIG. 1 is a representation of a telecommunications network, known in the prior art, consisting of a group of interconnected telecommunication exchanges referred to herein as nodes. Each node comprises a switching system for interconnecting telecommunication links terminating on the node. The principals of this invention are illustrated with respect to FIG. 1 by describing primarily the activities at an arbitrary selected node such as node 1. Node 1 is connected to node 2 via an interconnecting link 10, to node 3 via link 20, to node 4 via link 30, and to node 5 via link 40. Nodes 2 and 3 are interconnected by means of link 11, nodes 3 and 4 are interconnected via link 21, nodes 3 and 5 are interconnected via link 31 and nodes 5 and 6 are interconnected via link 41. Nodes 1 through 6 each may have other communication links, 12 through 62, respectively, connected thereto. Such additional communication links may be connected to other telecommunication exchanges, private networks or customer premises equipment. The various nodes of FIG. 1 may be represent major switching exchanges in different cities which serve as a conduit to handle traffic between other nodes as well as local traffic. Alternatively, some or all of these nodes may represent toll or internationally gateway offices used primarily only for handling long distance traffic. This illustrative embodiment of the invention pertains to handling of interexchange traffic, which may originate locally or from other distant exchanges as alternate route traffic. In the illustrative arrangement of FIG. 1, node 1 has direct routes to each of the nodes 2 through 5 as well as alternate routes via other nodes. For example, traffic between node 1 and node 3 may be routed over direct route 20 or via node 2 by means of routes 10 and 11, or via node 4 via routes 30 and 21. Similar direct and alternate paths exist between node 1 and nodes 2, 4 and 5. No direct route is shown between node 1 and node 6, but node 6 can be reached via node 5 using links 40 and 41. Any direct route between two nodes which serves as an alternate for another route, typically carries direct route outgoing traffic from various direct route source (e.g. sources 12), alternate route outgoing traffic from various other nodes and incoming traffic.

Figure 2:
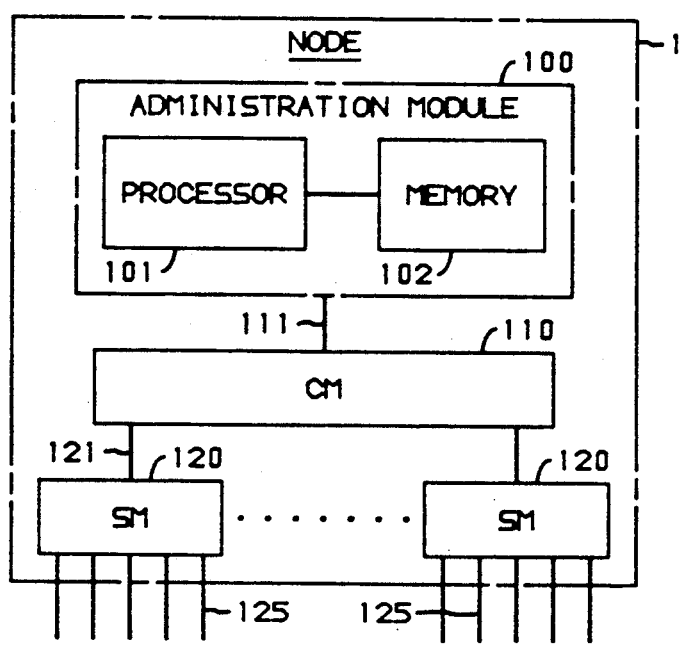
FIG. 2 is a block diagram representation of a telecommunications exchange as may be incorporated in the nodes of the network of FIG. 1.

FIG. 2 is a block diagram representation of the switching arrangement of a representative one of the nodes of FIG. 1, for example node 1. Each of the nodes of FIG. 1 include a switching arrangement which may be of an architecture similar to or different from the one shown in FIG. 2. These are well-known switching arrangements commonly used in the industry. One known arrangement is the AT&T 5ESS ® switch described in the AT&T Technical Journal, July-August 1985, Vol. 64, No. 6, Part. 2. The system of FIG. 2 shows a plurality of switching modules 120 each of which may be connected to a plurality of connection circuits 125. These may be well-known connecting circuits to other exchanges or private networks, or the like, commonly referred to as trunks, or may be subscriber lines. The switch module 120 will include a switching network and a control processor which are known from the prior art and not shown in the drawing. The switch module 120 typically transmits information received on circuits 125 to a communication module 110 via control links 121 and responds to commands from the module 110 to operate the switching network to establish paths between its circuits 125 or between such circuits and the communication module 110. Module 110 typically includes a switching network for establishing communication paths among switch modules 120, and between the switch modules 120 and the administrative module 100. The administrative module 100 includes a stored program controlled processor 101. The processor may, for example be the AT&T 3B20D processor described in the Bell System Technical Journal, January 1983, Vol. 62, No. 1, Part 2. The processor 101 communicates with communication module 110 via link 111. Typically, the processor 101 receives call processing related information from the switch modules 120 via the communications module 110, and programs in the processor 101 generate appropriate messages for transmission to the communications module 110 and switching modules 120 to establish the desired paths within the node. The processor 101 has an associated memory 102 for storing control programs, as well as, a number of maps, tables and database relations which are used in executing call processing programs.

Figure 3:
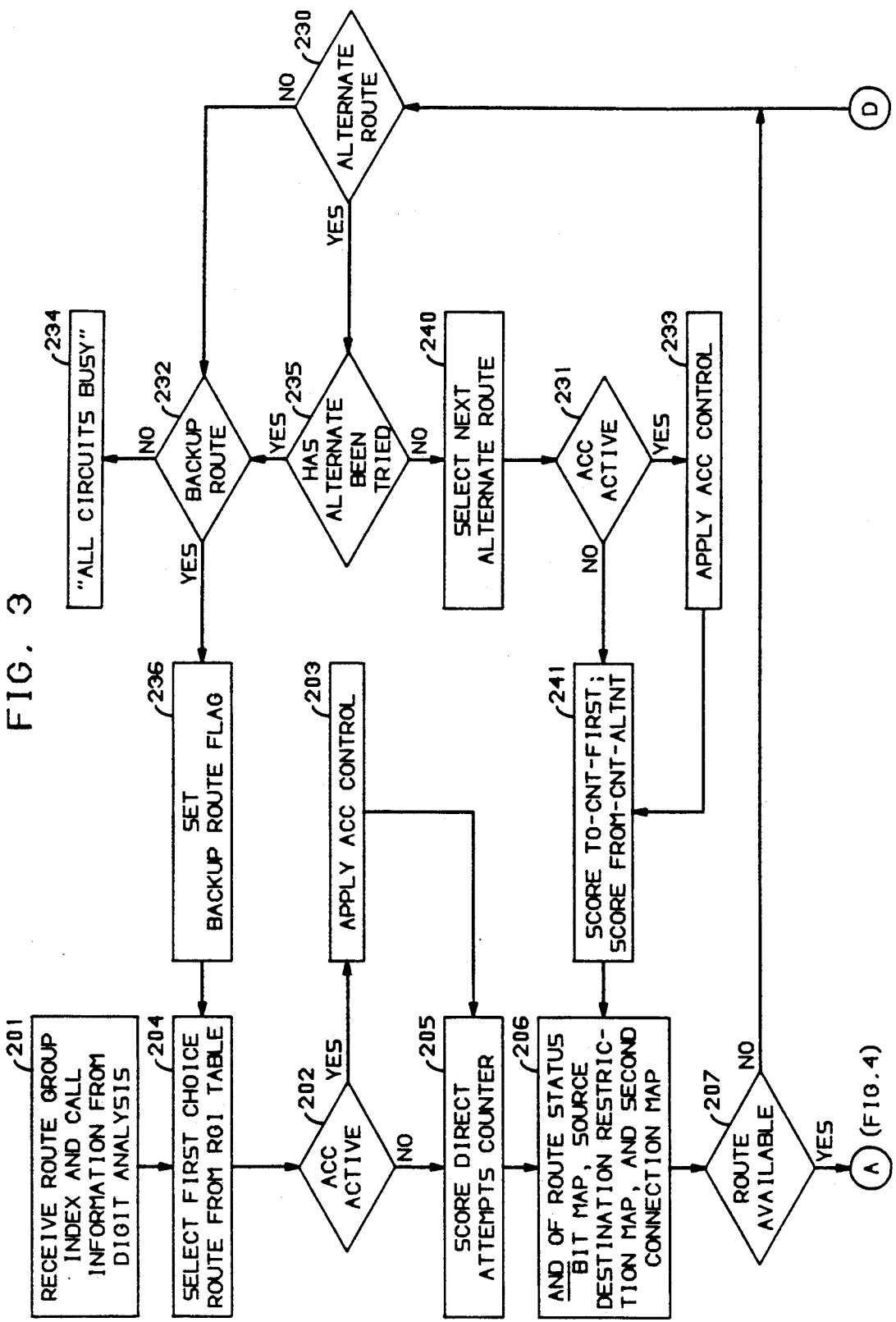
FIGS. 3 through 21 comprise flow chart representations of functions executed in the software of a stored program controller of a type shown in FIG. 2.

FIG. 3 is a flow chart representation of functions performed by route selection software executed by processor 101 in one of the nodes, for example node 1 of the illustrative arrangement of FIG. 1. Similarly actions may take place in the other nodes of the network. As is well known, a typical telephone call is originated by the transmission of a destination telephone number to an exchange where the number is analyzed to determine the necessary treatment for the call. In modern stored program control systems the call processing software typically includes a digit analysis program which interprets the called telephone number received from the customer and determines the routing for the call. Call processing programs are generally well known in the industry. One call processing program, including a digit analysis program, is described in the Bell System Technical Journal, Vol. XLIII, September 1964, No. 5, Part 2. Digit analysis includes determining whether a call is an intraexchange or an interexchange call. If it is an interexchange call, the digital analysis program defines a route group index (RGI) which is interpreted by means of information provided by the telephone administration administering the exchange and defining first choice and alternate routes for the call. The route group index is typically derived, by the digit analysis program with reference to predefined information such as class of service and other revelant data.

Figure 19:
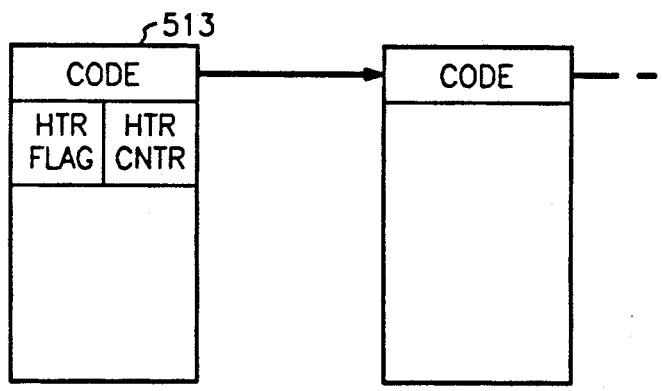

The flow chart of FIG. 3 starts in block 201 with the receipt of a route group index and call information from the digit analysis program. Based on the route group index, the route software, being executed on the processor 101, reads a database relation defining an RGI table, for example from memory 102 and selects a route as indicated in block 204. The RGI table includes for each route group index, a code identifying a first preference route and alternate routes. By way of example, Table 1 represents an illustrative RGI table showing first preference and alternate routes. It shows a route group index 100 and a code for the first preference route as route 20, and codes for first, second and third alternate routes as 10, 30 and 40, respectively. Other preferred and alternate routes, corresponding to routes of FIG. 1 are shown in Table 1 by way of illustration. In this illustrative embodiment, information stored in the RGI table is used to construct a network connectivity map. This table is constructed, for example, at program initialization and is updated whenever the RGI table is changed. A network connectivity map corresponding to the RGI table of Table 1, stored in memory 102, is shown in Table 8. The network connectivity map is easier to access than a database relation and is used to find alternate routes. Columns in table 8 show the alternate routes for a direct route identified in a row, by the presence of a '1' in the corresponding matrix element. Block 204, FIG. 3 indicates the step of obtaining the first choice route from the RGI table. Blocks 202, 203, 231 and 233 are described later herein with reference to FIGS. 19 and 20.

Block 205 represents the scoring or tallying of an attempt to use the first choice route selected in block 204. This attempt is scored in a traffic measurements table in memory 102. Table 10 is a representative table. One such table is maintained for each internodal route terminating on the node in which the table is maintained, for example, node 1. This table is used to record all call handling activity covering all of the circuits in the route. For example, the table for route 20 would cover all direct circuits between nodes 1 and 3 in FIG. 1. Since block 205 represents the scoring of an attempt on the direct route, an entry should be made in the table in the attempts (ATTS) column in the row under "direct traffic" corresponding to the source identified in the call information received in block 201. As is described later herein, attempts, seizures, and answers are recorded in this table for direct traffic and for two types of alternate route traffic namely "to" traffic representing traffic transferred from this route to an alternate route and "from" traffic representing traffic alternate routed fro another route to this route. Incoming traffic may also be recorded in this table. The scoring or tallying for such traffic will be done in a well known manner by the portion of the call processing programs handling incoming traffic and is not specifically described herein.

The node, in its memory 102 maintains a route status bit map showing busy/idle status of all of its direct routes to other nodes. An Example of the bits status map is shown in Table 2, wherein an idle condition of direct routes to nodes adjacent to node 1 is identified by a '1'1. Another table maintained in memory 102 of each node is a source destination restriction map. An example of such a map is shown in Table 3. This map indicates restrictions between nodes in the system and helps to define the possible routes from a source to a destination. For example, the map of Table 3, which contains a 1 when there is no restriction, indicates that calls coming to node 1 from node 2 cannot be routed on route 10 or route 40. The route selection program depicted in FIGS. 3 and 4 receives the source and destination information as part of the call information from the digit analysis program, as shown in block 201. Even though routes may exist physically, conditions may exist which prohibit use of the routes. In this example, route 10 leads back to the source, which is not an allowed path, and it may be that node 5 (route 40) has no agreement with node 2 for handling its traffic.

Yet another table in the memory 102 is the second connection map. As depicted in FIG. 1, for example, when a call is routed from node 1 to node 3 via node 2, the link 11 is the second connection in the route. The second connection map indicates the availability of that link. An example of the second connection status map is shown in Table 4. A link may not be available even though the connection exists due to an overload condition or a fault. When the route selected by the route selection program is an alternate route, the entry of map defined by the direct route (row) and the alternate route (column) defines the state of the second connection link. For example, a call from node 1 to node 3, for which the direct route is 20, may be routed via node 2 over links 10 and 11, or via node 4 links 30 and 21, or via node 5 over links 40 and 31. By way of example, Table 4 shows that for direct route 20, alternate route 10 has an available second link but alternate routes 30 and 40 do not. This map is updated by messages from the adjacent nodes, on a periodic basis, indicating whether restrictions exist. Utility of this map clearly depends on cooperation with other exchanges.

Block 206 of FIG. 3 indicates that the logical AND function is performed of the route status bit map (Table 2) for the route selected in block 204, with the entry of the source destination restriction map (Table 3) pertaining to the source of the call and the selected route, and with the second connection map (Table 4) entry for the pertinent direct and alternate routes. Assuming that the call destination is node 2, the route status bit map shown in Table 2 will indicate that for route 10, directing route to node 2, there is a 1 in the route status bit map. This indicates that there is at least one available circuit in this route for handling traffic. To determine the appropriate position of the source-destination restriction map, the source of the call, included in the call information received in block 210, must be taken into consideration. In the matrix of Table 3, the source destination restriction map, a '1' is found for route 10 for traffic originating from node 1 indicating that there are no restrictions for such a call. However, if this is a call originating from node 2, it may not be routed on route 10 as indicated by a '0' in the pertinent position. The matrix of Table 4, the second connection status map indicates a '1' at all diagonal positions. When a direct route is used, e.g. route 10 for calls from node 1 to node 2, the second connection map is not needed. For the sake of convenience, however, a '1' is inserted at the diagonal and this position is examined when a direct route is used. Thus, in this particular example, performance of the AND function in block 206 will show that direct route 10 from node 1 to node 2 is available.

In decision block 207, a test is made to determine whether or not the result of the AND function is true and the path is available. If the route is available, a determination is made is to whether there are any network management controls active with respect to this route, as described further later herein. If after checking for traffic controls a call is allowed to complete, a circuit must be in the route. The routes of FIG. 1 each consists of a number of circuit groups each comprising a number of transmission circuits. These circuit groups may correspond to different transmission media such as microwave, satellite, etc. Circuit groups may be selected on the basis of first available circuit group or in accordance with a standard distribution algorithm to assure that all circuit groups are used with approximately the same freqeuncy. Block 208 reflects the step of selecting a circuit group. The fact that the route status bit map indicates availability of the route presumes that at least one circuit in one of the circuit group is idle. For each circuit group, there is a circuit group status bit map, shown by way of example in Table 5. The status bit map shows a bit indicating availability for each circuit group in the route. When this map indicates availability, it is assumed that there is at least one circuit in the indicated circuit group which is available for service. In this example, circuit group 1 is available. The test for an available circuit is shown in block 210 of FIG. 3. In the event that no circuit group is available, an advance is made from decision block 210 to block 214 to reset the route status bit map to zero, thereby indicating that there are not available circuits in the route. In this manner, the route status bit map is self-auditing and self-correcting. If the route status bit map is set to 1, indicating availability, the first time an available is not found, it will be reset to 0. Furthermore, in connection with termination, the route status bit map is set to '1' each time a call on the route is terminated and a circuit is made available.

Figure 5:
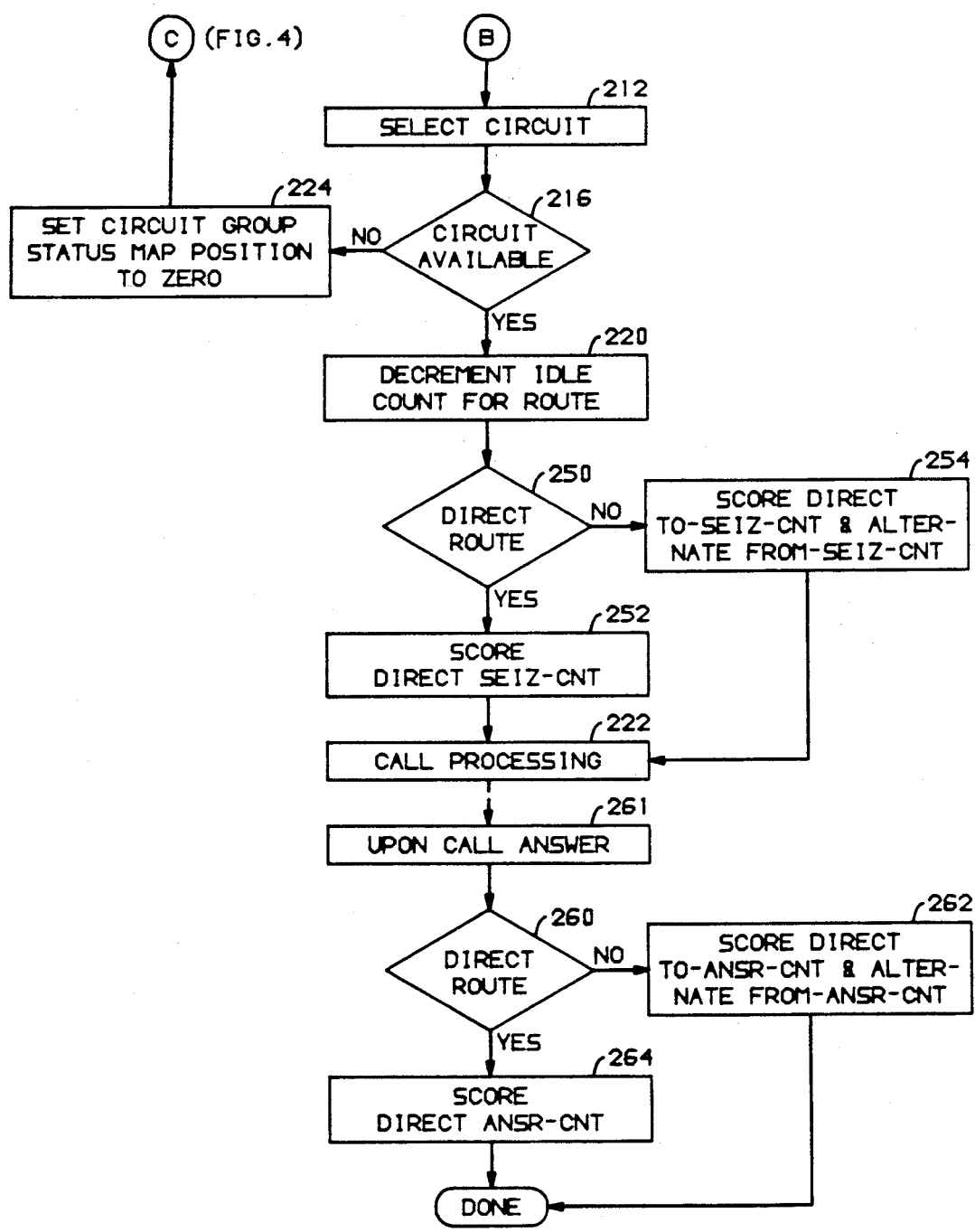

Block 212 of FIG. 5 indicates the step of selecting a circuit in the circuit group selected in block 208. A circuit group may have a larger number of circuits and in this illustrative embodiment the busy/idle bit map for each of the circuits of a group is accessed by means of a linked list. For example, a list of pointers addressable on the basis of the selected route and the circuit group will contain pointers to a corresponding area of memory containing busy/idle map, which may consist of any number of memory words. An exemplary busy/idle map is shown in Table 6. Bit positions 0 through 63 of the busy/idle map correspond to correspondingly numbered circuits and the 1 or 0 in a bit position indicates the abailability or nonavailability of the circuit. The busy/idle map is searched in a standard fashion. Any well known search and selection algorithms may be used for this purpose. A test is made in block 216 of FIG. 5 to determine if an idle circuit has been found. In the event that an available circuit is not found in the test in block 216, an advance is made to block 224 to set the circuit group status map position to zero. Like the route status map, the circuit group status map is also self-auditing and self-correcting in that the map is set to the busy condition when it is found that there is no circuit available in the group. Thereafter, a return is made to block 208 again to select another circuit group, and again a test is made of the circuit group status map in block 210 to determine if the selected circuit group is available.

Returning to decision block 207 of FIG. 3, a test is made to determine whether the path determined by the route selected in block 204 is available by testing the result of the AND function performed in block 206. If it is found that the selected route is not available, an advance is made to decision block 230 to determine whether there is an alternate for the previously tested route. This decision block 230 is also entered from block 214 is no available circuit group has been found in the previously selected route. To determine whether there is an alternate route, the network connectivity map (Table 8) is consulted. Since the previously selected direct route is known, the network connectivity map can be accessed at the proper position to find the identity of alternate routes. For example, for direct route 10, the alternate route is 20. A further test to be made, executed in decision block 235, is the comparison of the identity of alternate routes found in the network connectivity map with the identity of previously tried alternate routes. If one or more alternate routes are identified which have not been previously tried for this call, an advance is made to block 240 of FIG. 3 where the next alternate route is selected, and route and circuit availability is once again tested in the manner described earlier herein with respect to blocks 206 and subsequent blocks.

If it is found in executing the tests of blocks 230 and 235 that there is no alternate route or no alternate route which has not been tried, a determination is made whether backup route should be tried, as indicated in block 232. If not, an "all circuits busy" indication is provided to the call processing program, as indicated in block 234. The backup route test in block 232 allows for special treatment in case of certain high priority call types. The function of this feature is to restart the entire route selection procedure and may include resetting of certain timers in the related call processing program which might otherwise time out if an inordinate amount of time is taken in selecting a route. These actions with respect to call processing timers are taken by the call processing programs in a well known manner, in response to the setting of the backup route flag as indicated in block 236. After setting of that flag, a return is made to block 204 and the RGI table is examined in the B-RGI column (Table 1). The entry in this column reflects a back up route group index referring to another entry in the table, e.g., 500, which reflects a different first choice and alternate route for high priority calls. Therefore, the sequence indicated in block 204 and subsequent blocks, is repeated with respect to the new first choice route and alternate routes as discussed in previous paragraphs. The flag is also reset by the call processing programs. Attempts to use the back up route may be limited to a single try or several tries, by the means of a counter which toggled each time the back up route is tried.

Traffic measurements are taken on a pre-route basis during execution of the route selection programs. These measurements include recording the number of attempts, seizures, and answers. A table in the memory 102 records the traffic measurements for use by the network management software to implement and release controls on the routes to control the traffic flow. Table 10 is an exemplary traffic measurements table which lists a variety of traffic measurements which are taken on a per-route basis. As stated earlier herein, four types of traffic are monitored namely, direct traffic, "to" traffic, "from" traffic and incoming traffic. The table is maintained during execution of call processing and route selection software. In FIG. 3, block 205 indicates scoring of the attempts count for the direct route selected in block 204. Block 241 of FIG. 3 shows scoring of two separate counts when an alternate route has been selected. These counts are recorded for two different routes, each having its own traffic measurements table (Table 10). One count that is scored is in the "to" traffic entry in the table of the first choice route and the other count is in the "from" entry for the alternate route. By way of example, if the first choice route is route 30, which is not available, an alternate route for traffic from node 1 to node 4 may be route 20. Block 241 indicates that in the table for route 30, the first choice route, an entry will be made in the attempts column for "to" traffic for route 20, and an entry will be made in the table for route 20 in the attempts column under "from" traffic in the entry corresponding to route 30.

Figure 4:
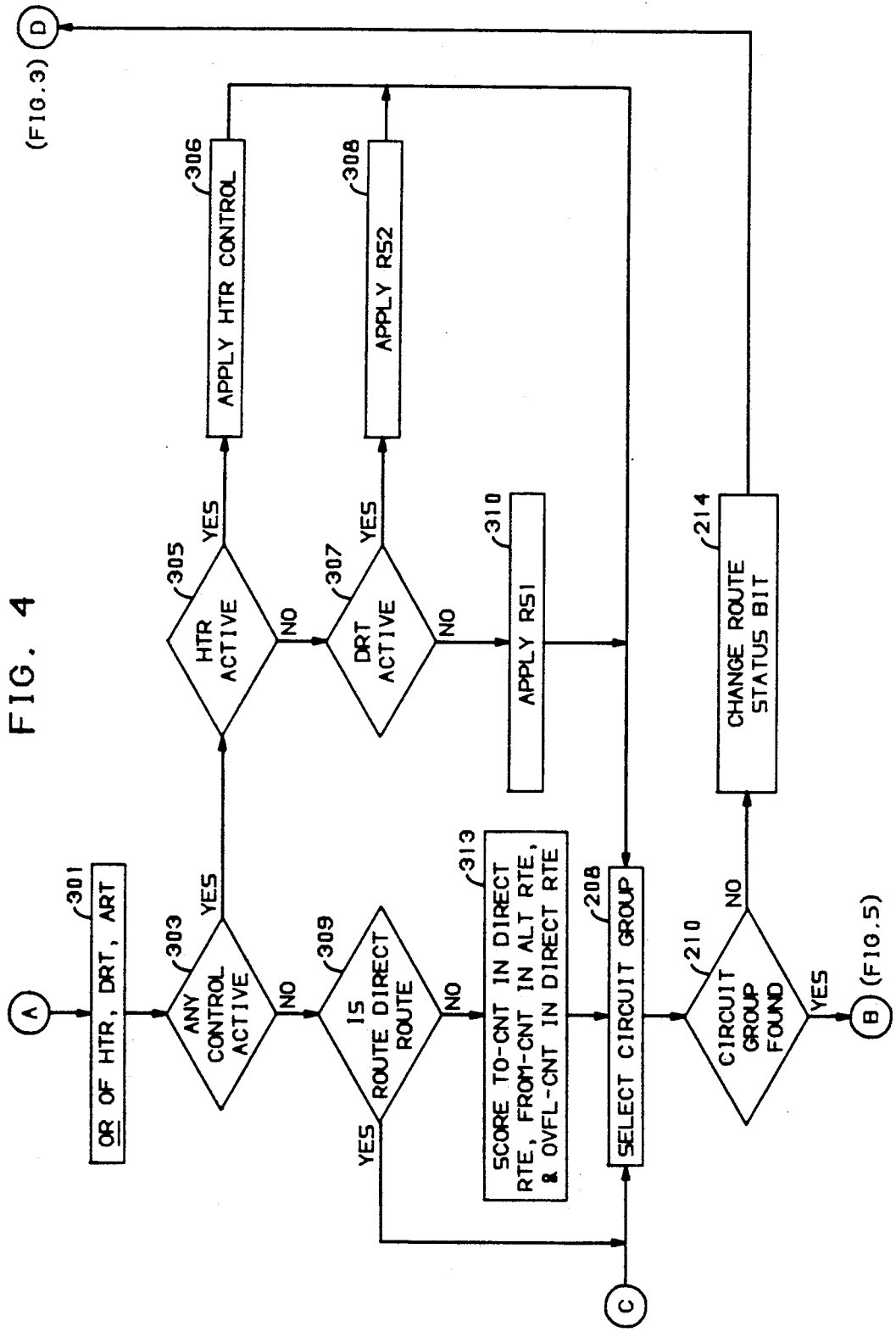

Referring to dicision block 207 of FIG. 3, an advance is made to block 301, shown in FIG. 4, for the purpose of determining whether any controls have to be applied to the selected route before continuing with the process of selecting a circuit within the selected route. Block 301 of FIG. 4 indicates the performance of the logical OR of three separate network management controls. Related to each of the three controls is a matrix referred to as the hard to reach matrix, shown by way of example in Table 11, an alternate routed traffic matrix as shown in Table 12 and the direct routed traffic matrix as shown in Table 13. As discussed later herein, if it has been previously determined that the attempts to answer ratio for a call on a route is too high, an entry may have been made in the HTR matrix. The HTR matrix (Table 11) lists direct routes on the horizontal rows and alternate routes in the columns. If a direct route is hard to reach, a 1 will be entered in the diagonal element and if past experience has shown that traffic for a direct route has encountered difficulty in using an alternate route, a "1" will be inserted in the element of the row corresponding to the direct route and column corresponding to the alternate route on which traffic from the direct route has encountered difficulty. Application of the hard to reach control makes use of a know network management technique of call gapping, that is, reducing the amount of traffic to a route by allowing only one call every predetermined time unit (e.g. 1 minute) to the hard to reach code.

An alternate routed traffic (ART) matrix (Table 12) and a direct routed traffic (DRT) matrix (Table 13) are used in connection with circuit reservations which are activated when the number of idle circuits in a route fall below a predetermined threshold. When the idle circuits count falls below a first level, circuit reservation level RS1, alternate routed traffic is controlled, and when it falls below a second level, circuit reservation level RS2, both direct and alternate traffic are controlled. When an excessive number of circuits, relative to the number of idle circuits are occupied by incoming traffic, an incoming load control message is sent to the other exchange requesting it to apply load controls. When it is determined that the first circuit reservation level control must be applied, an entry is made in the ART element corresponding to the row of the route for which the reservation level has been reached and in each column identifying a route which provides alternate traffic to the route identified by the row. When the second threshold level has been exceeded an entry is made in the DRT diagonal element corresponding to the route for which the reservation level is reached. Calls form a source are subject to control if the corresponding entry in the DRT matrix has been set by the craft and the diagonal bit is set.

Referring back to block 301 in FIG. 4, a logical OR is performed on the row and column element of each of the matrices corresponding to the selected direct or alternate route. By way of example, if the selected route is a direct route, the diagonal element of each matrix is considered. If the route being tested is an alternate route, the element corresponding to the originally chosen direct route and the selected alternate route is considered in the ART and HTR matrices and the diagonal of the DRT matrix is again considered. A test is made in block 303 to determine, based on the result of the logical OR, if any control is shown to be active. If so, an advance is made to block 305 to determine if the HTR control is active; based on an examination of the HTR matrix. If it is, an HTR routine will be executed as indicated in block 306. If HRT control is not active, a test is made in block 307 to determine if the DRT is active, based on an examination of the DRT matrix. If so, to a routine for applying the RS2 control is activated as indicated in block 308. If the DRT is not active, then it is assumed that the RS1 reservation level has been exceeded and an RS1 routine is activated as indicated in block 310. In the event that no control is active, a test is made in block 309 to determine if this is a first choise direct route and if so, an advance is made to block 208 to continue with the route selection process. If it is an alternate route, the overflow (OVFL) and the "to" count are scored in the originally selected direct route traffic measurements table and the "from" count is scored in the traffic measurements table of alternate route, as indicated in block 313. Thereafter, an advance is made to the route selection sequence at block 208. Performance of the OR function of the three matrices referred to in block 301, may also be performed at other points in the sequence rather than at the specific location shown in the diagram. For example, it may be beneficial to apply controls before a test is made to determine that a path is available as, for example in decision block 207, in order to avoid making this test for calls that may be canceled by network management controls. For example, the check for circuit reservation level to direct routed traffic control may be done immediately after the first choice route has been selected in block 204. Similarly, the check for HTR control on the direct route can be made after the first choise route has been selected in block 204. The check for HTR control and for circuit reservation level 1 alternate routed traffic control could be made after the alternate route has been selected in block 240.

Circuit reservation levels are defined in terms of the number of idle circuits remaining in a route. The number for each route may be readily maintained by means of a counter for each route such as shown by way of example in Table 7 which is decremented when a circuit is seized and incremented when a circuit is released. Block 220 in FIG. 5 represents the step of decrementing the counter when a route is available for use. Additional scoring of various counts for the purposes of network management is also done in the illustrative embodiment of the invention. Block 250 shown in FIG. 5, indicates a test to determine if the selected route is a first choise direct route, and if so the direct traffic seizure count corresponding to the source of the call is incremented in the traffic measurements table (Table 10), as shown in block 252. If it is not a direct route, the "to" traffic seizure count for the direct route at the entry corresponding to the selected alternate route is scored, and the "from" seizure count is scored for the selected alternate route in the entry corresponding to the direct route, as indicated in block 254. Completion of a call is performed by normal call processing routines, as indicated in block 222. When the call is answered the call processing routine calls the present routine as indicted in block 261. In decision block 260 it is determined whether or not this is a first choice direct route. If so, the answer count is scored in the traffic measurments table (Table 10) for the direct routine the direct traffic entry corresponding to the source of the call, as indicated in block 264. If route used is an alternate route, the answer is scored in the traffic measurement table for the direct route under "to" traffic in the entry corresponding to the alternate route and an entry is made in the traffic measurement table for the alternate route under the "from" traffic in the entry corresponding to the direct route as indicated in block 262.

Figure 6:
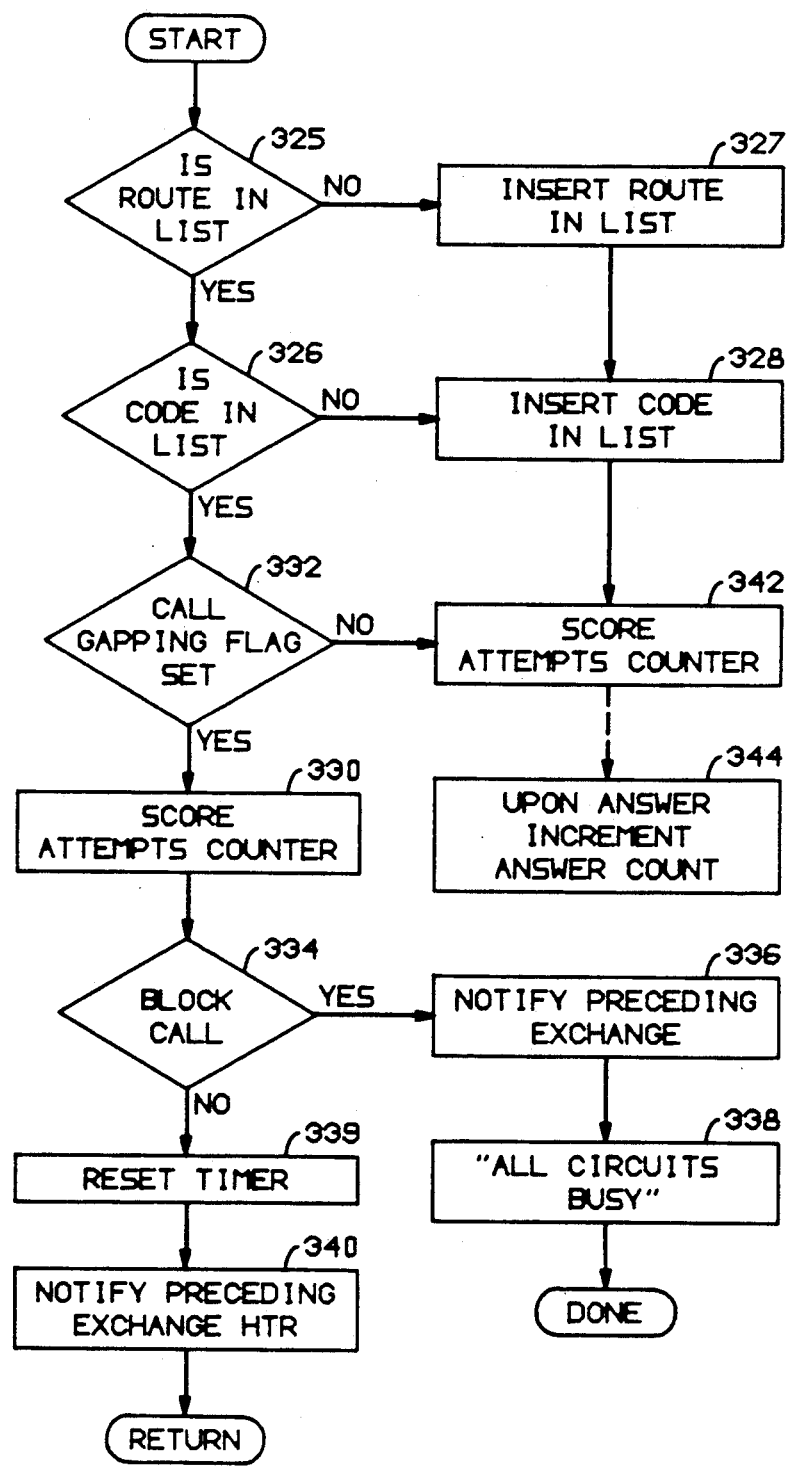
Figure 16:
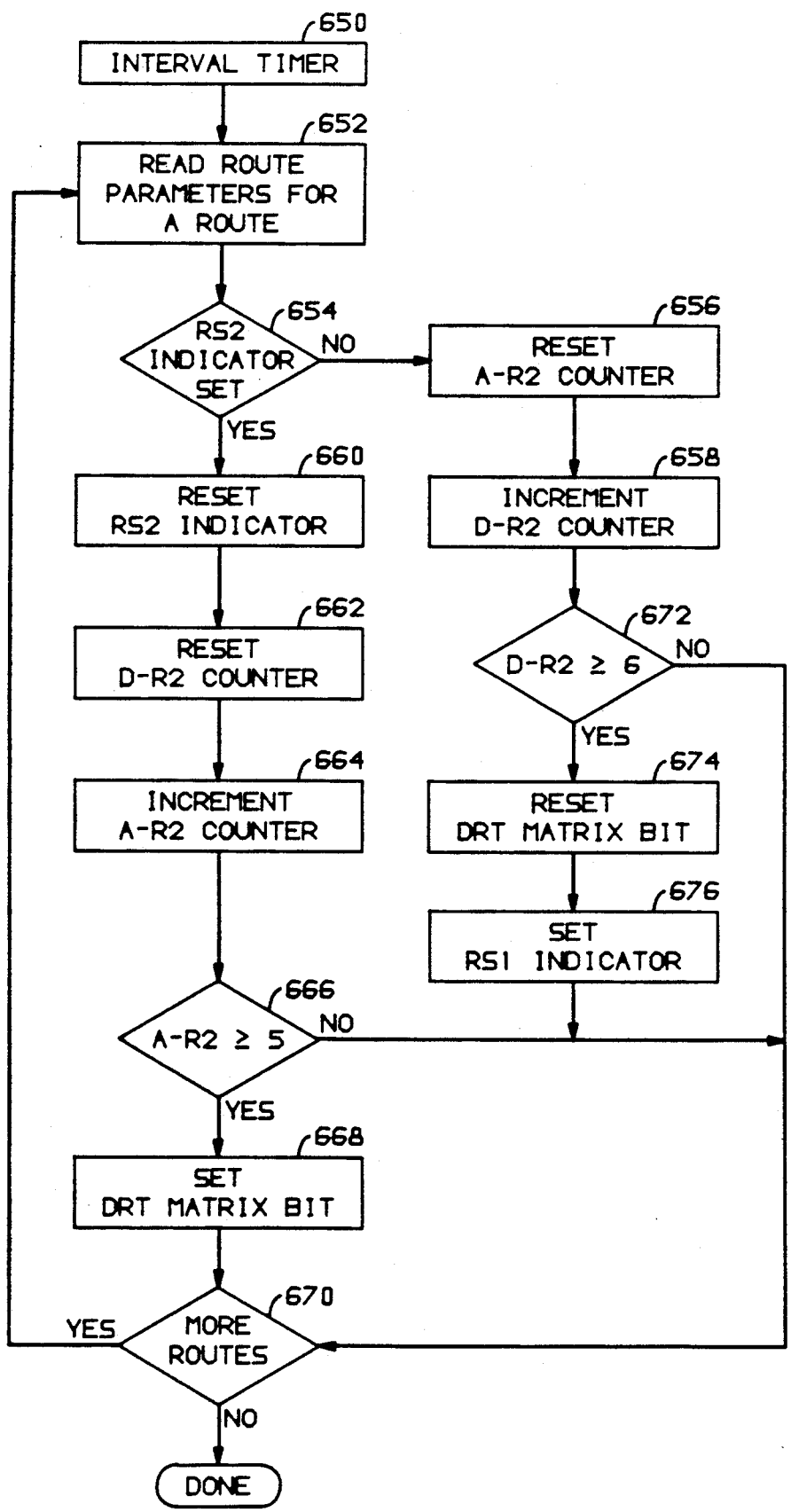

FIG. 6 is a block diagram representation of a routine for applying HTR control and creation of a list of hard to read codes. This routine executes the function reflected in block 306 of FIG. 4. FIG. 16 is a representation of lists in memory 102 which include a first list 502 listing the identification of all routes which have been designated as hard to reach, together with a linking address to a list of directory number codes which use the identified route. List 502 includes a linking address to a further control block 503, for the destination code comprising information used in connection with this and other routines and a linked list pointer to other control blocks for other codes. The sequence of FIG. 6 enters hard to reach destination codes in the lists and applies call blocking where appropriate. Entry is made into block 325 of FIG. 6 from decision block 305 of FIG. 6 after it has been determined that there is an HTR condition on the selected route based on information in the HTR matrix (Table 11). A first test is made in block 325 to determine whether the route is in the list, if not, it is inserted in list 502 as indicated in block 327. If it is in the list, a test is made in block 326 to determine if the destination code for this call is in the list of codes for the selected route. If the code is not in the list it will be inserted in the block as indicated in block 328. Thereafter, the attempt counter (ATTS) for the particular code will be incremented in the memory control block, as indicated in block 342. If it is determined in decision block 326 that the code is in the list, a test is made in block 332 to find whether or not the call gapping flag has been set in memory block 503 associated with this code. If the flag is set, the attempts counter (ATTS) for this code is scored, as indicated in block 330. In decision block 334 it is determined whether this particular call should be blocked. This test is made by comparing the timer with the current time. If the timer has not expired, then the call is blocked and a message is sent to the proceding exchange which is the source of the call, as indicated in block 336, that the call cannot be completed. As indicated in block 338, an indication is sent to the call processing program to provide an all circuits busy. If it is found that the timer has expired, the call can be allowed. In that case the timer is reset as indicated in block 339 by adding the gap index to the current time and notification is sent to the preceding exchange indicating that the call has received HTR treatment. In the event that it is determined in block 332 that the call gapping flag is not set, the attempts counter (ATTS) of memory block 503 is incremented as indicated in block 342. When the call is answered, an indication will be received from the call processing program causing the answer count (ANSR) in memory block 503 to be incremented, as indicated in block 344.

Figure 7:
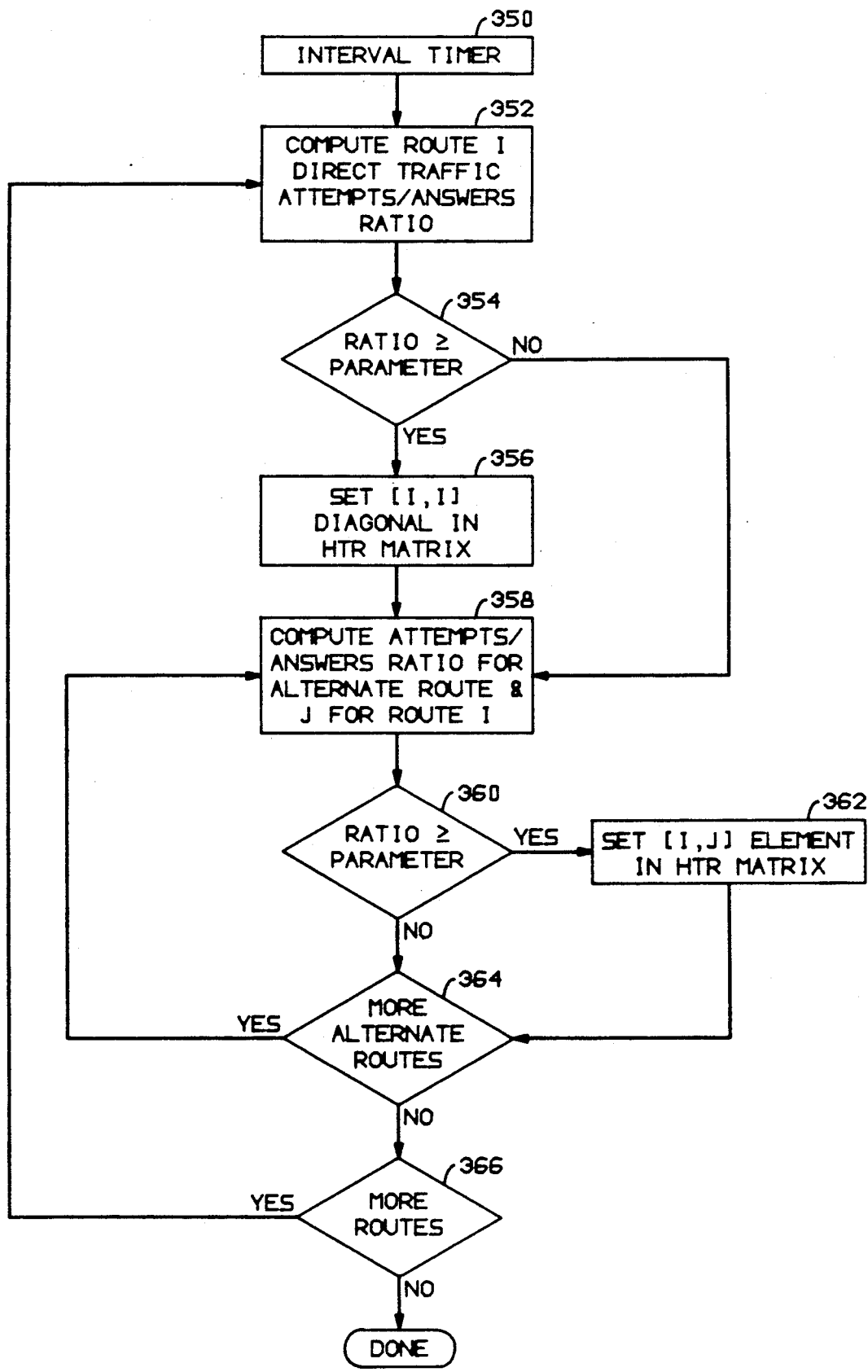

Hard to reach routes are determined from traffic measurements information namely by computing the attempts to answer ratio information recorded during the route selection/call processing process, and shown for example in Table 10. Table 10 includes direct traffic entries showing the sources 1 through N. The total attempts and answers for direct traffic for a particular route are compared and if the ratio of attempts to answer is not satisfactory, an entry is made in the hard to reach (HTR) matrix, shown for example in Table 11. Such a computation is initiated periodically, for example every 5 minutes, as indicated in block 350 of FIG. 7. Block 352 indicates computation of the attempts to answer ratio for a selected route, route I. In block 354, a test is made to determine whether the ratio is greater than the parameter specified for this ratio. This may be a global parameter for the office and may be referred to as the HTR threshold ratio as shown for example in Table 1. A ratio of 5 may, for example be specified. If it is determined in block 354 that the ratio exceeds the specified parameter, a 1 is placed in the diagonal element of the HTR matrix for the route being examined. Thereafter, the attempts to answer ratio for each of the alternate routes for the route selected in block 352 is examined, as indicated in block 358. The information defining attempts and answers is obtained from the "to" traffic entries of the traffic measurements table (Table 10) for route I, where the attempts and answers are listed for each route to which traffic has been diverted from this route. The ratio of attempts to answer for an alternate route, route J, is compared to the specified parameter which is a global parameter and may be the same as the threshold ratio for the direct routes. If it is greater than the parameter, the I, J element, corresponding to the selected route I and the alternate route J, of the HTR matrix is set to 1. If the ratio for the particular alternate route has not been exceeded, a determination is made in block 364 to check whether there are additional "to" traffic routes which have not been checked. When all such routes have been checked, an advance is made to block 366 to determine if there are more routes in the exchange for which HTR values have not yet been computed. In the same manner, if for the test in block 354 it is determined that the ratio for the direct route is at an acceptable level, an advance will be made to block 358 and each of the alternate routes for that direct route will be checked individually as described above.

Figure 8:
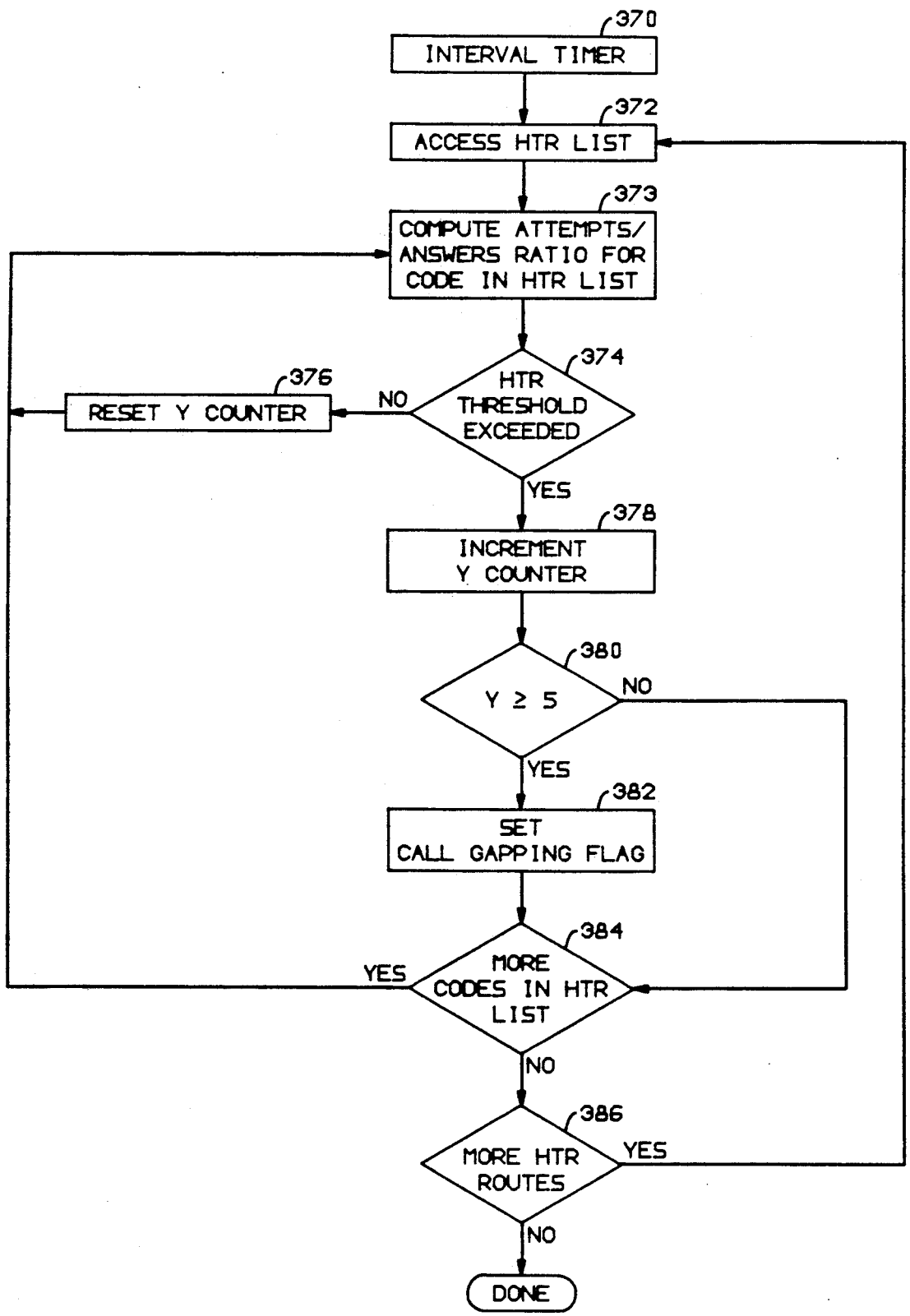

FIG. 8 outlines a routine, in flow chart form, for activating call gapping control, which is a well known network management control for hard to reach codes. An interval timer activates this routine periodically, for example every 2 minutes, as indicated in block 370 of FIG. 8. The routine accesses the HTR route list 502

(FIG. 16) as indicated in block 372, and computes the attempts to answer ratio for the first code of the first route listed in the list, as indicated in block 373. As indicated in block 374, the ratio is compared with the HTR threshold, which is a global parameter, shown by way of example in Table 9. If the threshold is exceeded, a counter in the memory block 503 for the destination code, referred to as the Y counter, is incremented as shown in block 378. A further test is conducted in block 380 to determine whether the Y counter exceeds a specified number such as, for example the number 5 indicating that the HTR threshold has been exceeded for at least five consecutive time periods. In that case, the call gapping flag in the control block 503 is set for the particular code, as indicated in Block 382. If it is found in block 374 that the threshold is not exceeded, the Y counter is reset and additional codes are examined for the route selected in block 372. Furthermore, if the Y counter is not equal to or greater than the number specified in block 380, an advance is made to block 384 to determine if there are more codes to be examined for the selected route. If not, a test is made in block 386 to determine if there are additional routes to be examined in the HTR list. In this manner, the call gap flag is set for each code of each route for which the HTR threshold has been exceeded for Y consecutive time intervals.

Figure 9:
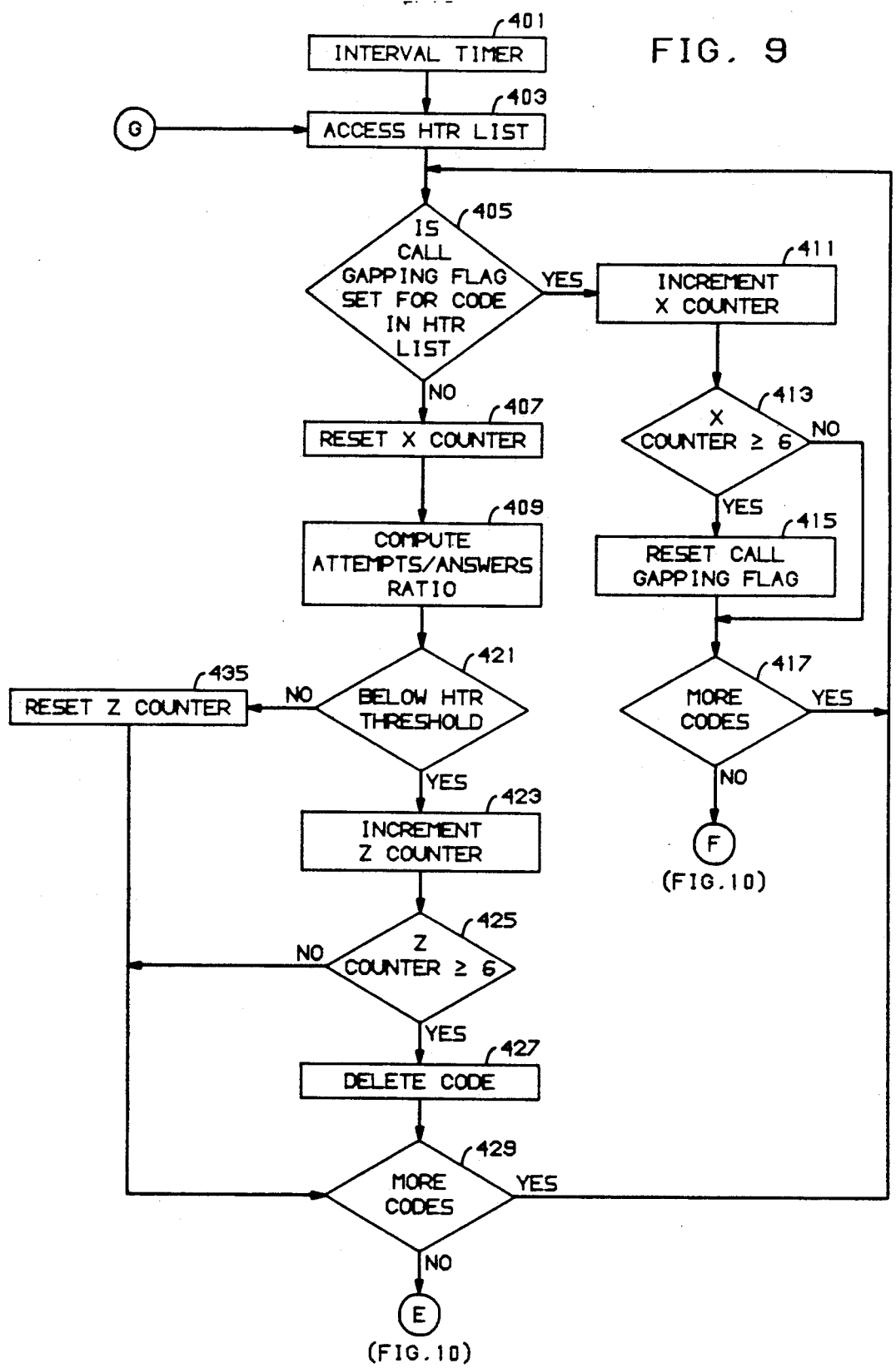
Figure 10:
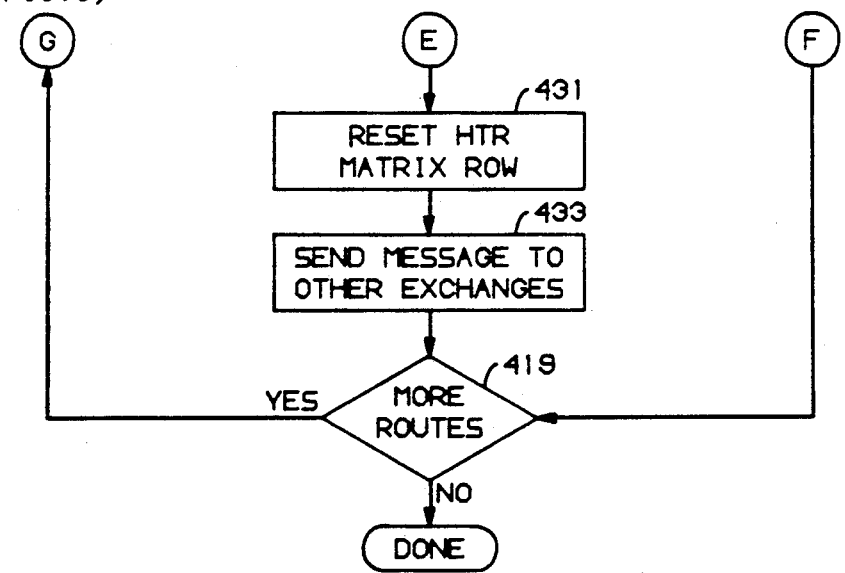

The flow chart of FIG. 9 shows a sequence for deactivating call gapping for codes and for removing codes from the HTR list. As indicated in block 401 of FIG. 9, this program is entered periodically upon the expiration of an interval timer, for example once every three minutes. In block 403 the HTR list shown at 502 in FIG. 5 is accessed. The first code for a first route is examined to determine if the call gap flag is set, as indicated in block 405. The X counter of memory block 503 is incremented as indicated in block 411 of FIG. 9. This counter is used to deactivate call gap control if the control has been active for X consecutive intervals. In block 413 the X counter is read and if its value is greater than a predetermined number, for example 6, the call gap flag is reset as indicated in block 415. The purpose of resetting the call gap flag after a specified period of time, is to assure that call gapping control is not appoied for an inordinate amount of time. The call gap flag will be set again if its found that the code is in fact still hard to reach. After the call gap flag has been reset as indicated in block 415, an advance is made to block 417 to determine if there are more codes for the route selected in block 403. If there are more codes, a return is made to block 405 and the sequence is repeated. A test is made in block 419, shown in FIG. 10, to determine if all routes have been examined after all codes for a particular route have been examined.

If it is determined in block 405 that the call gap flag is not set, the X counter is reset as indicated in block 407 and the attempts to answer ratio for the particular code being examined is computed as indicated in block 409. If this ratio falls below the HTR threshold (Table 9), a Z counter (memory block 503) is incremented as indicated in block 423 and in block 425 a test is made to determine whether the Z counter exceeds a predetermined number, for example the number 6. If the attempts to answer ratio has been below the threshold for six consecutive intervals, the code is deleted from the HTR destination code list as indicated in block 427. In this manner, the HTR destination code list is updated periodically. This is repeated for all codes as indicated in block 429. After all codes have been deleted for a particular route, the HTR matrix row for that route is reset to 0 as indicated in block 431, shown in FIG. 10. Thereafter, a message is sent to adjacent exchange indicating that the route is no longer hard to reach as indicated in bolck 433, shown in FIG. 10. In the event that the ratio tested in block 421 is not below the threshold, the Z counter is reset as indicated in block 435 and an advance is made to block 429 to determine if there are more codes in the route under examination. In the event that the Z counter is not greater than 6 as indicated by the test in block 425, an advance is also made to block 429 to determine if there are more codes. After each code of each route has been examined, the routine is finished.

Figure 11:
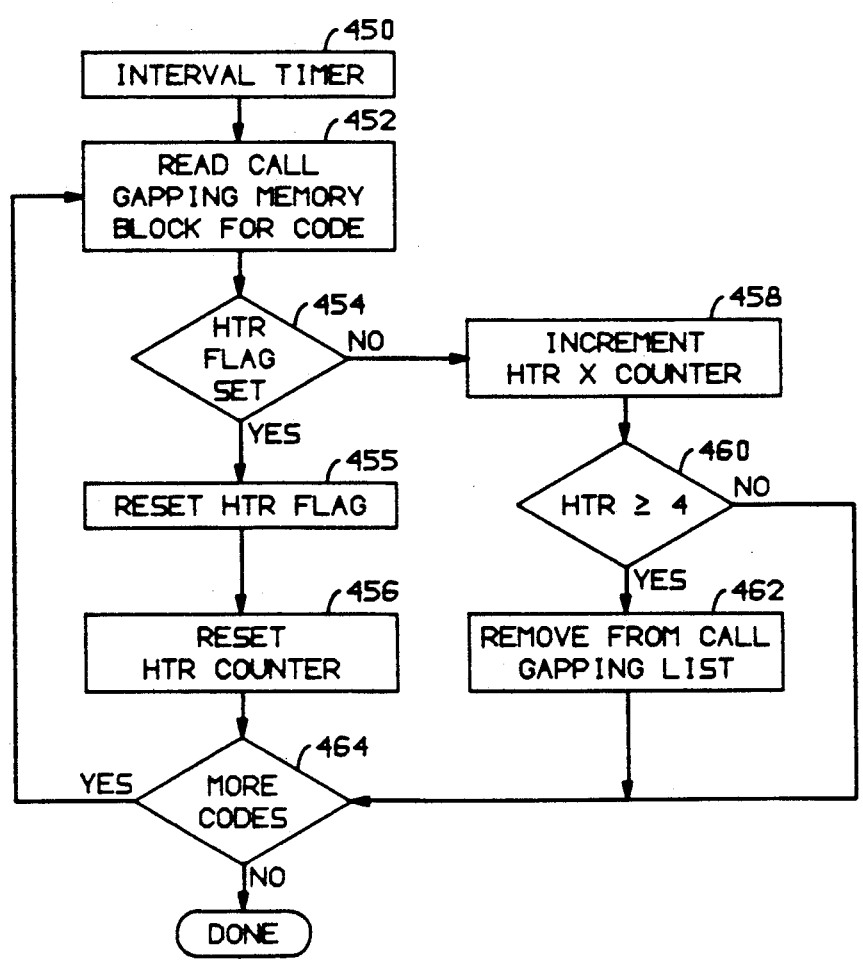

As discussed in connection with FIG. 6, a preceding exchange may be notified when call gapping is to be applied. In accordance with common network management practices, a list is created in the receiving exchange which lists the destination codes for which a HTR notification has been received. This list is examined by the route selection program in a well known manner for the purposes of applying call gapping in a well known manner (not shown in the flow charts). FIG. 11 is a flow chart for a routine for removing hard to reach codes stored in a linked list, such as shown for example in FIG. 19, including a memory block 513 for each code. The memory block 513 includes an HTR flag which is set in response to a message from another exchange. The flag is examined periodically and reset after a predetermined number of time intervals in order to systematically remove codes from the call gapping list. The routine is entered in response to an interval timer as indicated in block 405 of FIG. 11. The routine may be executed for example once every five minutes. The routine begins by reading the call gap memory block for a first code, as indicated in block 452. If the HTR flag for that code is set, this routine resets the HTR flag and resets an HTR counter of the memory block 512 associated with the code. The sequence is indicated in blocks 454 through 456. If upon examination of the memory block in block 454 it is determined that the flag is not set, the HTR counter is incremented as indicated in block 458 and a test is made to determine the value of the counter in block 460. If the value exceeds a certain number, for example 4, this indicates that the code has been on the call gap list for at least four time intervals, and is removed from the list as indicated in block 462. After functions executed in blocks 456, 460 and 462 an advance is made to block 464 to determine if there are more codes in the call gap list. In this manner all codes in the call gap list are visited. If another HTR message is received for a particular code, the HTR flag will again be set in the memory block and at the first subsequent time that the routine of FIG. 11 is executed the flag will again be reset and the code will be removed from the list after it has remained in the reset condition for the specified number of intervals.

Figure 12:
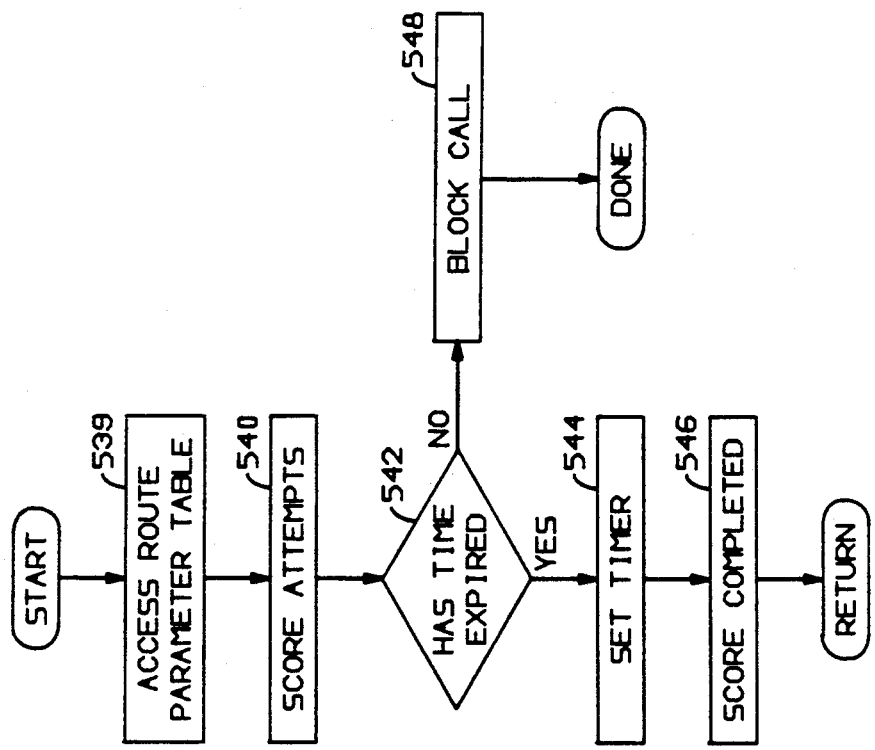
Figure 20:
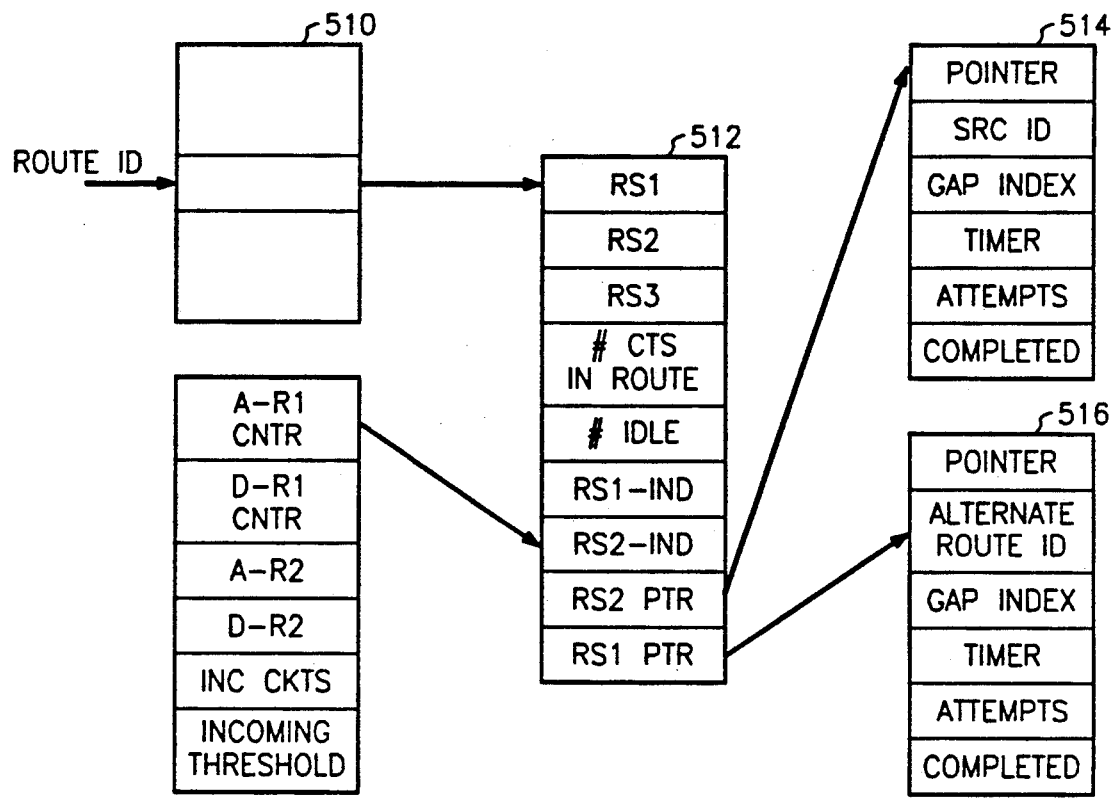

As shown in FIG. 4, when it is determined in block 301 of FIG. 4 that the direct route control activity bit has been set in the DRT matrix for the route under consideration, RS2 direct route traffic controls are applied, as indicated in block 310. FIG. 12 shows the sequence executed in applying direct routed traffic control. Associated with each route are route parameters and control blocks relating to application of circuit reservation. FIG. 20 is a representation of an area in memory used for recording such information. This will include a route ID table 510 as well as a parameter table 512 for each route and a linked control block 514 for each source for reservation level RS2 and a control block 516 for each alternate route for reservation level RS1. FIG. 12 is entered from block 308 of FIG. 4 after it has been determined that the RS2 circuit reservation level is active. Control block 514 is accessed via a route ID table 510 and the RS2 pointer of parameter table 512, as indicated in block 524. In block 525, an attempts counter (ATTS) in control block 514 for reservation level RS2 is incremented. After scoring the attempt, a test is made in decision block 527 to determine whether the timer in control block 514 has expired. As explained before, the timer value is set by adding the gap index of block 514 to the current time and timer expiration is determined by comparing the current time with the timer value, in a well known manner. If the time has expired, the timer is set as indicated in block 529, to a new value and the "completed" count in block 514 is incremented as indicated in block 531. In the event that the test in block 527 indicates that the timer has not expired, the call is blocked by sending a message to the call processing software indicating that the call not be completed, as indicated in block 532. The call processing software will respond in a well known manner to provide busy condition signaling to the caller.

Figure 13:
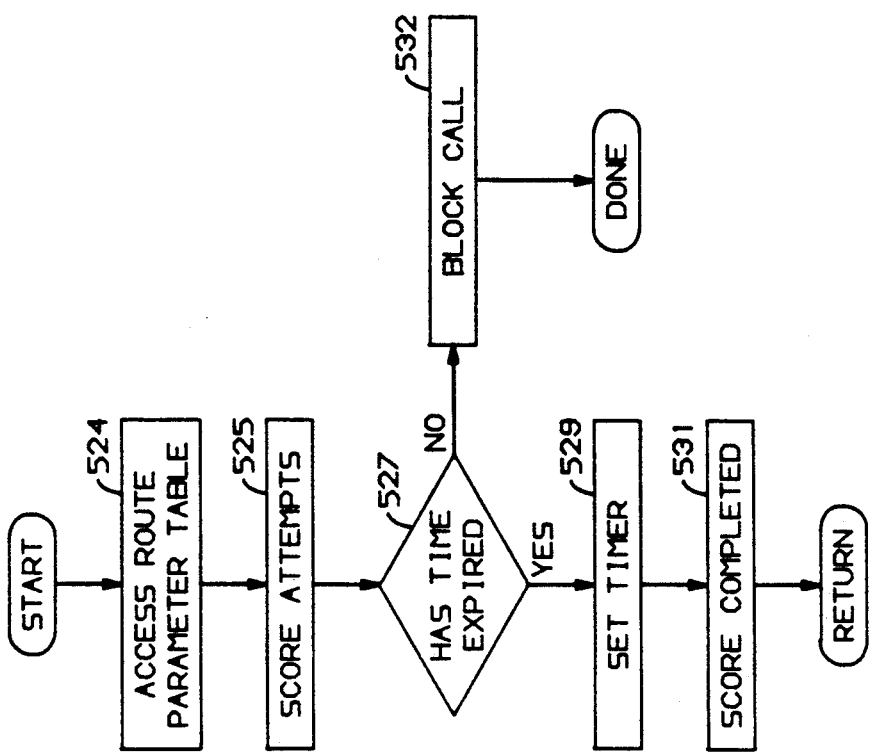

FIG. 13 represents a flow chart of a routine for applying circuit reservation level RS1 alternate route traffic (ART) control, indicated in block 310 of FIG. 4. FIG. 20 shows a control block 516 for an alternate route. One such control block exists for each alternate route which provides traffic to a direct route. The control block 516 is accessed by reading the route ID table 510 and RS1 pointer of block 512 of FIG. 20, as indicated in block 539 of FIG. 13. Block 540 in FIG. 13 indicates that the attempts counter in control block 516 is incremented. Thereafter, a test is made in decision block 542 which reads the timer of control block 516 to determine whether the timer has expired. The timer is set to allow a single call to be complete during a predefined period of time, which is defined by the gap index of the control block 516. If the timer indicates that the period has elapsed, a single call is allowed to be completed. First, in block 544 the timer is set again to define the next perion of blocking. In block 546 the "completed" count in control block 516 is incremented. Thereafter, a return is made to the route selection program of FIG. 4 as indicated at box 310 of FIG. 4. In the event that it is determined in the test of decision block 542 that the time has not expired, the call will be blocked by sending a message to the call processing software indicating that the call is to be blocked, as indicated in 548. The call processing software will respond in a standard manner to provide busy condition signaling to the caller.

FIG. 13 is a routine for periodically examining the count of idle circuits in each route and comparing that number with the predefined circuit reservation levels. Each route is defined in terms of a number of circuit groups, each comprising a number of individual circuits. The number of idle circuits can be determined from the circuit busy idle map (e.g. Table 6) or computed by a means of a separate tally in the call processing programs by incrementing and decrementing a number each time a circuit is released or seized (e.g. Table 7). The number may be stored periodically for example in the route parameters block 512 shown in FIG. 20. The number of idle circuits is examined periodically by initiation of the sequence of FIG. 14 in response to the expiration of an interval timer as indicated in block 550. The interval timer may be set for example to 5 minutes.

Figure 14:
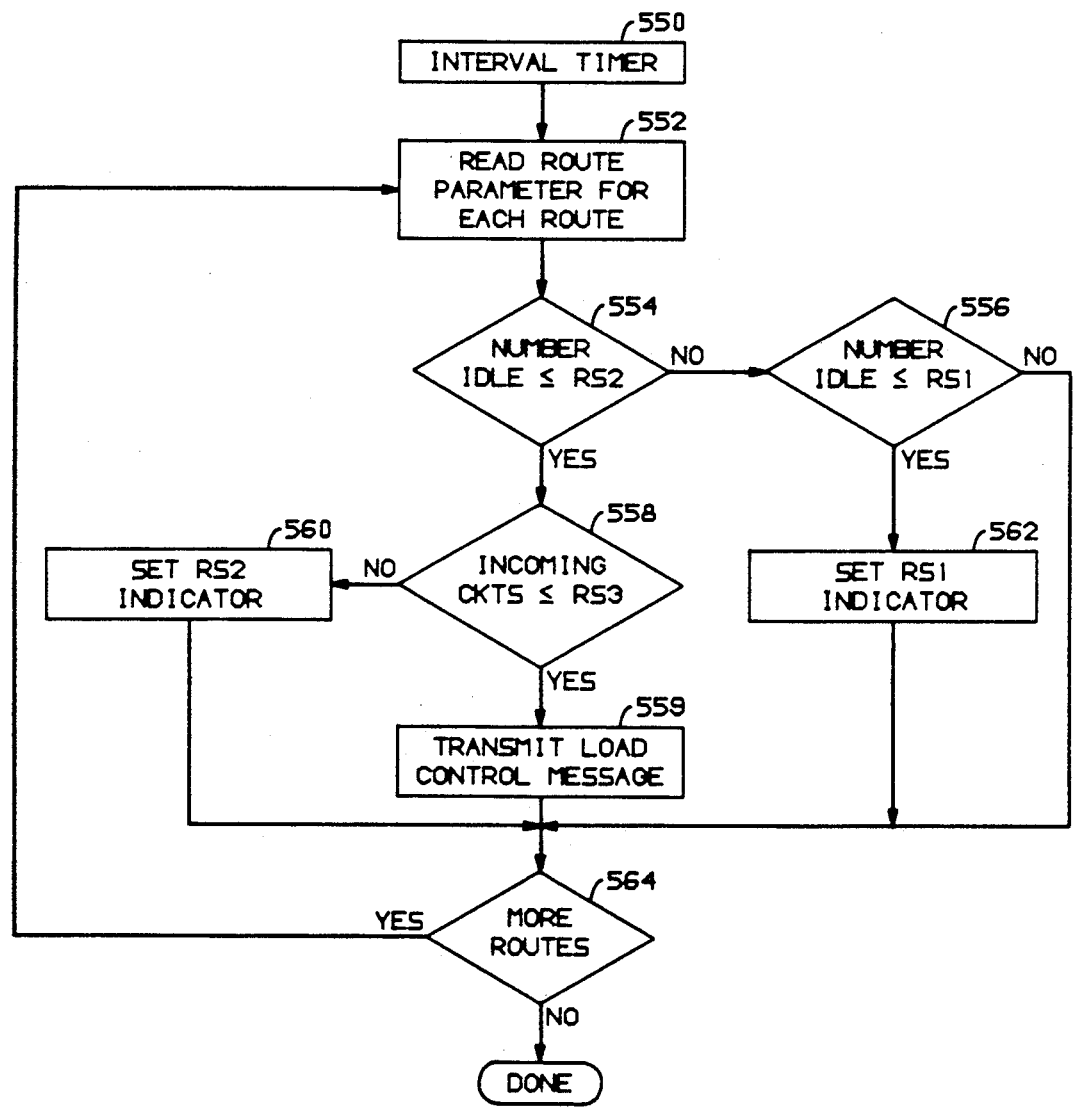

The route parameter table 512 is examined for a particular route as shown in block 552 of FIG. 14. The number representing idle circuits is compared with circuit reservation parameters RS1, RS2 and RS3 stored in the route parameters block 512. In the present illustrative embodiment, reservation level RS1 represents the level at which alternate traffic to a route may be restricted, where as the reservation level RS2 represents the level at which both direct and alternate traffic is restricted reservation level RS3 is the level at which a preceding exchange is requested to activate load control on traffic on the route. By way of example, reservation level RS1 may be 100 idle circuits and RS2 may be 50 idle circuits. Reservation level RS3 is defined in terms of number of circuits occupied by incoming traffic. When the idle circuits drop below the RS2 level and number of incoming circuits is above a predetermined threshold, e.g., 60 of all available circuits, incoming traffic is controlled. In blocks 554, the number of idle circuits is compared to the levels RS2 and RS1 respectively. If the test in block 554 number of idle circuits is less than the RS2 level, a test is made in block 558 to determine whether incoming traffic control has to be applied. In block 558, the number of circuits occupied with incoming traffic, as recorded in block 512, is compared to the incoming circuit threshold. Incoming attempts are measured by the call processing programs, as shown in Table 10, and recorded in the route parameter table. If the threshold is exceeded, incoming load control is applied by transmitting a load control message to the other exchange on this route, as indicated in block 559, which will apply load control in a well known fashion, such as by call gapping. If the test in block 558 indicates that incoming load control is not warranted, the RS2 indicator in Table 512 is set as indicated in block 560, requiring RS2 control, which will include RS1 control. If the test in decision block 554 indicates that the number of idle circuits is above the RS2 level, a test is made in block 556 to determine whether the number of idle circuits is below the RS1 level. If so, the RS1 indicator in Table 512 is set, as indicated in block 562, requiring alternate routed traffic control. Upon completion of these functions with respect to one route, a test is made in a decision block 564 to determine if there are more routes in the route table 510 and the same functions will be performed again. The program is finished when the number of idle circuits for all routes has been examined.

Figure 15:
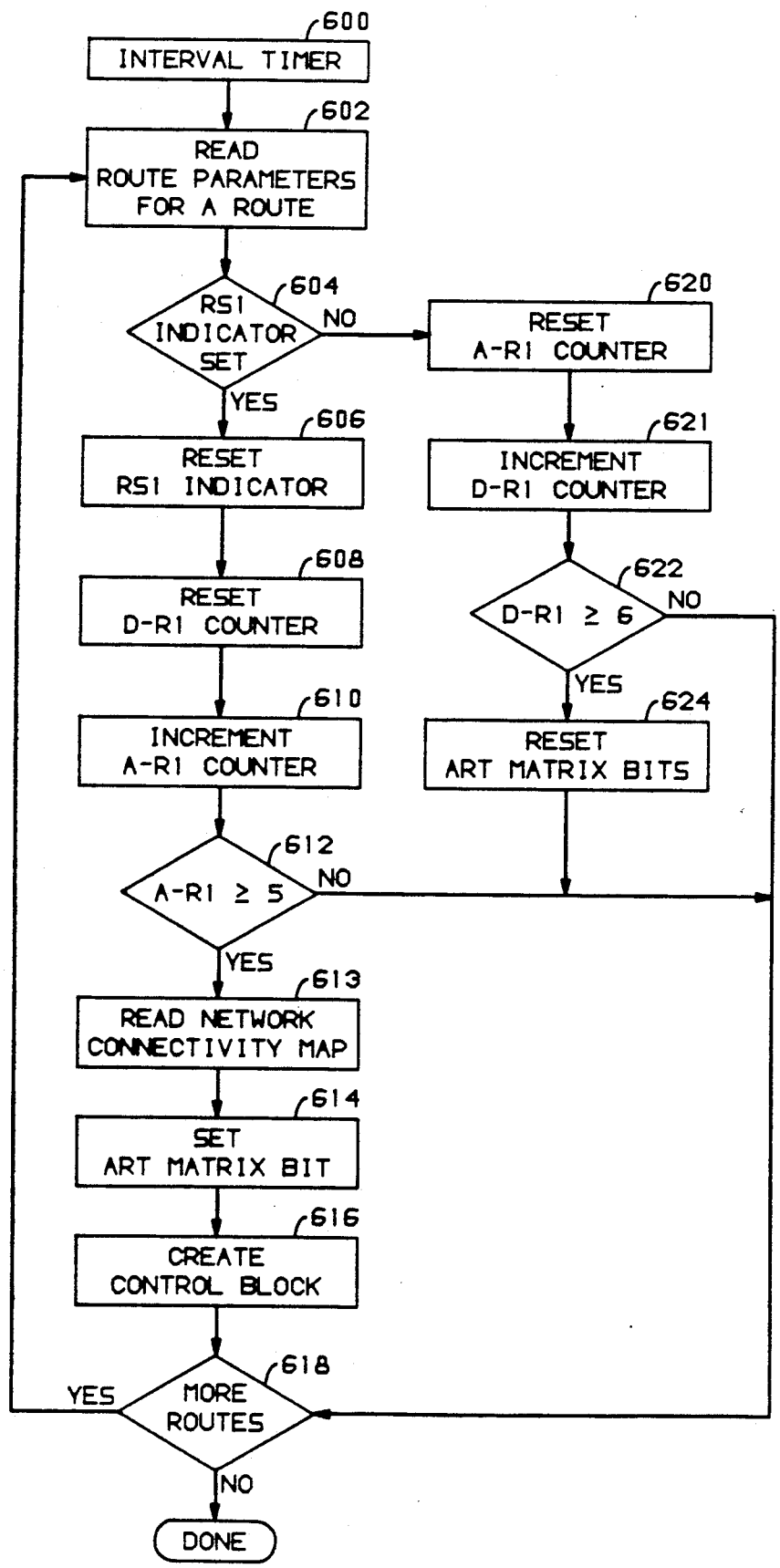

FIG. 15 is a flow diagram representation of a routine for periodically examining the state of the RS1 indicator which may be set by execution of the routine of FIG. 14. The routine of FIG. 15 is entered in response to an interval timer, as indicated in block 600. The interval timer may be set to initiate the routine, for example once every 5 minutes. The route parameters table 512 is read for each route in the route table 510 of FIG. 20, as indicated in block 602 of FIG. 15. The RS1 indicator from the route parameters block is examined in decision block 604 and if it is set, the indicator is reset in block 606. Two counters are used in this routine, an A-R1 counter used in connection with activating the RS1 circuit reservation and a D-R1 counter used in connection with deactivation of the RS1 circuit reservation. In block 608 the D-R1 counter is reset and in block 610 the A-R1 counter is incremented. In decision block 612 a test is made to determine whether the A-R1 counter has exceeded a predetermined count, for example 5, and if so the appropriate matrix bit position in the alternate routed traffic (ART) matrix is set as indicated in block 614. If the count of the A-R1 counter is less than 5, it is an indication that the RS1 indicator has not been set (e.g., by the routine of FIG. 13) in 5 consecutive time intervals. In that case, the matrix bit is not set in order to avoid a rapid activation and deactivation of management controls. In order to determine the bits to be set in the ART matrix, a representation of which is shown in Table 11, the network connectivity map (Table 8) is consulted as indicated in block 613. The bit of the ART matrix corresponding to the route under consideration in the execution of this routine, and each of the routes which use this route as an alternate, is set in the ART matrix as indicated in block 614. By way of example, if the route under consideration is route 20, then a 1 would be placed at the elements in row 20 of the ART and in columns 10, 30 and 40, because routes 10, 30 and 40 are shown to use route 20 as an alternate route in the network connectivity map of Table 8. After the ART matrix bit has been set in block 614, an alternate route control block such as shown at 516 in FIG. 20 is created for each of the affected alternate routes. The control block will have a gap index which is used to set a timer, as well as, a timer entry for use in determining whether a call should be blocked. The gap index will define the time period during which one call may be allowed to go through. After the control block has been created, a test is made in block 618 to determine whether there are more routes in the route table 510 to be examined. If not, the routine is completed. If it is determined in decision block 604 that the RS1 indicator is not set, the A-R1 counter is reset as indicated in block 620 and the D-R1 counter is incremented as shown in block 621. A test is made in block 622 to determine whether the D-R1 counter is greater than a predetermined value, for example 6. If it is, it indicates that for six consecutive intervals the RS indicator has not been set and, hence, the appropriate bits of the ART matrix may be reset. Since the RS1 indicator for this route has been reset for a specified time interval, all entries associated with this route in all of the columns of the ART matrix are deleted. The action of deleting this bit is shown in block 624 of FIG. 15. Thereafter, an advance is made to decision block 618 to determine if there are more routes to be examined.

Figure 18:
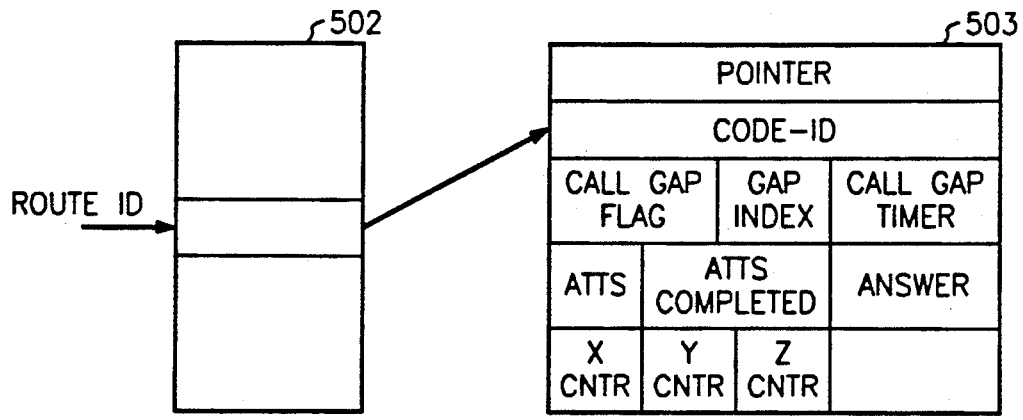

FIG. 16 is a flow chart representation of a routine for activating and deactivating the circuit reservation level RS2 which is used to apply controls on direct routed traffic on a route. The direct routed traffic (DRT) matrix a representation of which is shown in Table 12, is used in the route selection process to determine whether or not controls are to be applied. The routine of FIG. 16 is executed periodically in response to an interval timer, as indicated in block 650. The interval may be for example 5 minutes. As indicated in block 652, the route parameters shown for example at 512 in FIG. 20 are examined for each route in the route table 510 of FIG. 18. Block 652 of FIG. 16 indicates reading route parameters for a particular route and block 654 indicates a test to determine whether the RS2 indicator of block 512 is set. This routine employs two counters, an A-R2 counter used to count intervals before RS2 level circuit reservation is activated and a D-R2 counter used in the deactivation of the control after the RS2 indicator has not been set for a number of consecutive intervals. If it is found in decision block 654 that the RS2 indicator is set, that indicator is reset in block 660. The D-R2 counter is reset as indicated in block 662 and the A-R2 counter is incremented as indicated in block 664. A test is conducted as indicated in block 666 to determine whether the A-R2 counter is greater than a predetermined number, such as for example 5. If not, an advance is made to a decision block 670 to determine whether there are additional routes in the route table 510 which need to be examined. If not, the routine is finished. If it is found in the test shown in decision block 666 that the A-R2 counter exceeds the specified number, an appropriate bit is set in the direct routed traffic (DRT) matrix. The matrix is shown by way of example in Table 13. The DRT matrix is defined in terms of routes and sources of traffic. Any route may receive traffic from a number of different sources. For example, with respect to FIG. 1, traffic on route 20 from node 1 to node 3 may include traffic from route 10, route 30 or route 40 which uses route 20 as an alternate to reach destination node 3. The DRT matrix may have been preset to indicate that controls should be applied to traffic from source route 10 and source route 30 but not from source route 40. In that event, a 1 would be inserted in the matrix element at the intersection of the column for route 20 and the rows for routes 10 and 30 and a 0 would have been inserted in that column in the row corresponding to route 40. In blocks 668 of FIG. 16 a 1 would be set at the diagonal of route 20 and source 20 to indicate that circuit reservation level RS2 is in effect and the other information in the column corresponding to route 20 will indicate which of the routes are subject to the control. If the test indicated in decision block 654 shows that the RS2 indicator is not set at the time of this examination, the A-R2 counter is reset and the D-R2 counter is incremented as indicated in blocks 656 and 658, respectively. A test is made, as indicated in decision block 672 to determine whether the value of the D-R2 counter exceeds a predetermined value, for example 6. If not, an advance is made to decision block 670 to determine whether more routes need to be examined. If the value of D-R2 is equal to or greater than 6 the D-R2, the diagonal matrix bit, for the route is reset thereby removing the RS2 circuit reservation as indicated in block 674. Since the RS2 level reservation includes the RS1 level reservation, the deactivation of RS2 level is used to activate the RS1 level, as indicated in block 676.

Figure 17:
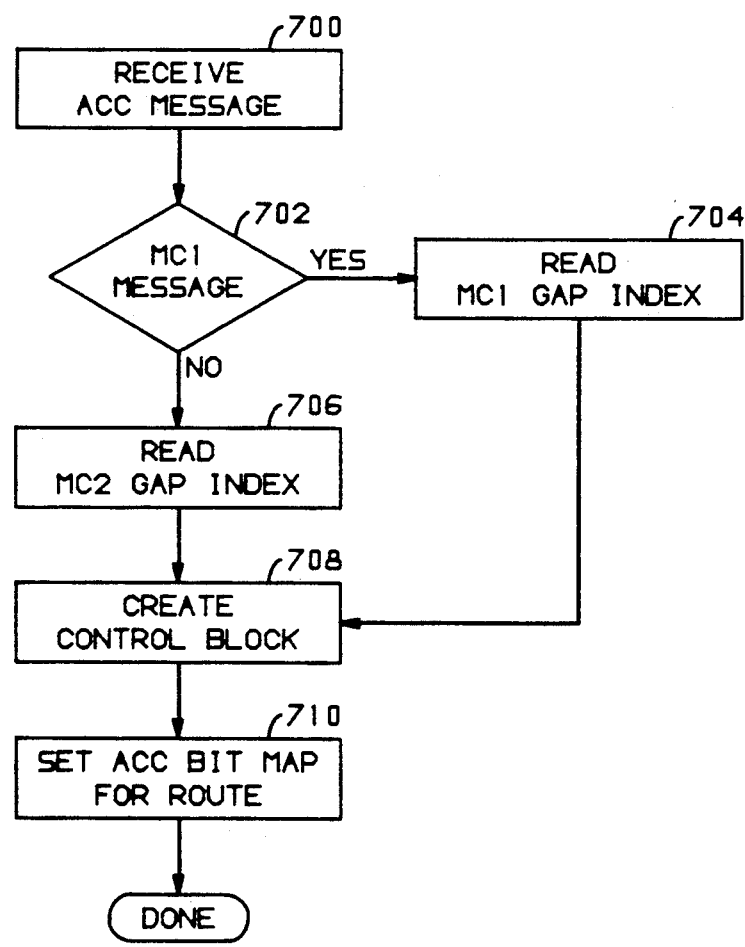
Figure 21:
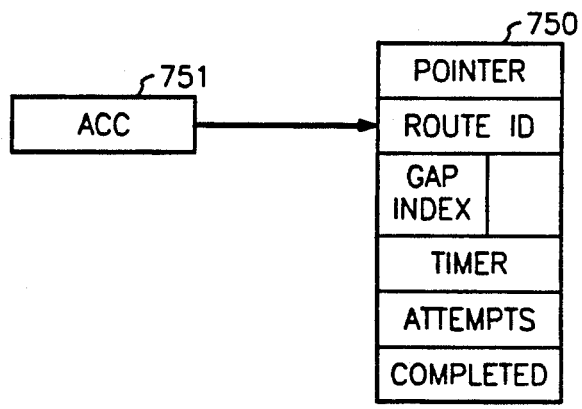

Overload conditions may occur at a node when the call traffic is such that there are insufficient hardware and software resources to handle all the calls. Automatic congestion control (ACC) is implemented in the present system on a per-route basis in response to a broadcast message transmitted from the congested exchange to all adjacent exchanges using standard interexchange signaling techniques and may indicate different levels of machine congestion referred to herein as machine congestion 1 (MC1) and machine congestion 2 (MC2). The receiving exchange activates a bit map shown by way of example in Table 14 and stores an MC1 gap index and MC2 gap index in its global parameters shown by way of example in Table 9. When an automatic congestion control message is received at the receiving exchange, a sequence is executed as outlined in FIG. 17. Block 700 indicates the receipt of the automatic call control message and in block 702 a test is made to determine whether this message relates to machine congestion 1 (MC1) or machine congestion 2 (MC2). If it relates to machine congestion 1, the MC1 gap index is read from the global parameters shown in Table 9, as indicated in block 704. The gap index is used to create a control block, as indicated in block 708 of FIG. 17. The MC control block, an example of which is shown at 750 in FIG. 21 is stored in the memory 102 with other tables and control blocks and access via ACC access location 751. The control block is created as part of a linked list with a route ID identifying the route to the exchange from which the message was received, and a pointer to subsequent control blocks. The gap index obtained from the global parameters is entered in the control block and a timer value is computed by adding the gap index to the current time. An "attempts" entry and a "completed" entry may be included in the control block to allow the traffic measurements for calls attempted and completed under automatic congestion control to be recorded. If it is determined in the test of block 702 that this is not an MC1 message, it is assumed that it is an MC2 message and the MC2 gap index is obtained, as indicated in block 706. Thereafter, the control block is generated in block 708, as described above with a different gap index. After creation of the control block, the bit map of Table 14 is updated to reflect the fact that ACC has been activated for the indicated route, for example for route 20. The contents of the ACC bit map is used in route selection. ACC control is applied by the use of call gapping, using the timer value in the control block, by checking to see whether the timer has expired each time a call is received for the route and allowing one call to complete each time after the timer has expired. After a call has been completed on the route, the timer is reset and another call is allowed at the next occasion that the timer is read and is shown to be expired. FIG. 3, in decision block 202 shows the step of checking the ACC bit map and block 203 shows applying the ACC control if the bit map for the route selected in block 204 has been set. The control is applied by means of call gapping and the function of block 203 may include scoring each attempt and each completed call. Block 231 and 233 perform the same functions as blocks 202 and 203, only after an alternate route has been selected in block 240. The difference between levels of control is reflected in the value of the gap index shown in the parameters of Table 9. MC gap index 2 for example may be considerably longer than MC gap index 1, causing the timer to be set for a longer period of time in each case, thereby reducing the number of calls that will be completed in a unit of time.

It is to be understood that the above-described arrangement is merely an illustrative application of the principles of the invention numerous other arrangements may be devised by those skilled in the art without departing from the spirit and scope of the invention.

TABLE 1

ROUTE GROUP INDEX TABLE

| RGI | F | ALT1 | ALT2 | ALT3 | B-RGI |
|---|---|---|---|---|---|
| 100 | 20 | 10 | 30 | 40 | 500 |
| 200 | 30 | 20 | — | — | |
| 300 | 40 | 20 | — | — | |
| 400 | 10 | 20 | — | — | |
| 500 | 30 | 40 | | | |

TABLE 2

ROUTE STATUS MAP

| 10 | 20 | 30 | 40 |
|---|---|---|---|
| 1 | 1 | 0 | 1 |

TABLE 3

SOURCE DESTINATION RESTRICTION MAP

| Source | Destination | | | |
|---|---|---|---|---|
| | 10 | 20 | 30 | 40 |
| 1 | 1 | 1 | 1 | 1 |
| 2 | 0 | 1 | 1 | 0 |
| 3 | 1 | 0 | 0 | 1 |
| 4 | 1 | 0 | 0 | 0 |
| 5 | 0 | 1 | 0 | 0 |

TABLE 4

SECOND CONNECTION STATUS MAP

| Direct Route | Alternate Route | | | |
|---|---|---|---|---|
| | 10 | 20 | 30 | 40 |
| 10 | 1 | 1 | 1 | 1 |
| 20 | 1 | 1 | 0 | 0 |
| 30 | 1 | 0 | 1 | 1 |
| 40 | 1 | 0 | 1 | 1 |

TABLE 5

CIRCUIT GROUP STATUS MAP

| GROUP # | | | | | |
|---|---|---|---|---|---|
| 0 | 1 | 2 | 3 | 4 | ... |
| 0 | 1 | 1 | 0 | 1 | ... |

TABLE 6

CIRCUIT BUSY IDLE MAP

| 31 | 30 | 29 | . | . | . | . | . | 0 |
|---|---|---|---|---|---|---|---|---|
| 1 | 0 | 0 | . | . | . | . | . | 0 |
| 63 | . | . | . | . | . | . | . | 32 |
| 1 | . | . | . | . | . | . | . | 1 |

TABLE 7

ROUTE IDLE COUNT

| 12 | . | . | . | . | . | . | . | 0 |
|---|---|---|---|---|---|---|---|---|
| | | | | . | 1 | 0 | 1 | |

TABLE 8

NETWORK CONNECTIVITY MAP

| Route | Alternate Route | | | |
|---|---|---|---|---|
| | 10 | 20 | 30 | 40 |
| 10 | — | 1 | 0 | 0 |
| 20 | 1 | — | 1 | 1 |
| 30 | 0 | 1 | — | 0 |
| 40 | 0 | 1 | 0 | 0 |

TABLE 9

GLOBAL PARAMETERS

| HTR THRESHOLD RATIO = | 5 | (determined by |
| HTR INTERVAL = | 4 | Admin) |
| CODE THRESHOLD = | 5 | |
| MC GAP INDEX 1 = | 30 SEC | |
| MC GAP INDEX 2 = | 120 SEC | |

TABLE 10

TRAFFIC MEASUREMENTS

| | | INC | | | |
|---|---|---|---|---|---|
| | ATTS. | ATTS. | SEIZS | ANSRS | OVFL |
| DIRECT TRAFFIC | | | | | |

TABLE 10-continued

| TRAFFIC MEASUREMENTS | | | | | |
|---|---|---|---|---|---|
| | INC ATTS. | ATTS. | SEIZS | ANSRS | OVFL |
| SOURCE 1 | | | | | |
| SOURCE 2 | | | | | |
| SOURCE n | | | | | |
| INC. TRAFFIC | | | | | |
| ROUTE A | | | | | |
| ROUTE B | | | | | |
| ROUTE n | | | | | |
| 'TO' TRAFFIC | | | | | |
| ROUTE A | | | | | |
| ROUTE B | | | | | |
| ROUTE n | | | | | |
| 'FROM' TRAFFIC | | | | | |
| ROUTE A | | | | | |
| ROUTE B | | | | | |
| ROUTE n | | | | | |

TABLE 11

| | HTR MATRIX | | | |
|---|---|---|---|---|
| | ALTERNATE ROUTE | | | |
| ROUTE | 10 | 20 | 30 | 40 |
| 10 | 1 | 1 | — | — |
| 20 | 1 | 1 | 1 | 1 |
| 30 | | | | |
| 40 | | | | |

TABLE 12

| | ALTERNATE ROUTED TRAFFIC (ART) | | | |
|---|---|---|---|---|
| | ALTERNATE ROUTE | | | |
| ROUTE | 10 | 20 | 30 | 40 |
| 10 | | | | |
| 20 | 1 | 0 | 1 | 1 |
| 30 | | | | |
| 40 | | | | |

TABLE 13

| | DIRECT ROUTED TRAFFIC (DRT) | | | |
|---|---|---|---|---|
| | ROUTE | | | |
| SOURCE | 10 | 20 | 30 | 40 |
| 10 | | 1 | | |
| 20 | | 0 | | |
| 30 | | 1 | | |
| 40 | | 0 | | |

TABLE 14

| ACC BIT MAP | | | |
|---|---|---|---|
| 10 | 20 | 30 | 40 |
| | 1 | | |

I claim:

1. In a telecommunications system comprising a plurality of interconnected exchanges the method of controlling traffic on a route, which includes all interconnecting circuits between a first exchange and any one other exchange, comprising the steps of:
   collecting separate traffic activity data for each of a plurality of types of traffic, said plurality comprising direct routed outgoing traffic, alternate routed outgoing traffic, and incoming traffic, for a route;
   comparing said traffic activity data with predetermined control criteria distinctive to each of said traffic types; and
   selectively applying traffic controls to limit the traffic on said route only in a selected one or selected ones of said type or types of traffic which meet said predetermined control criteria.

2. The method in accordance with claim 1 wherein said step of selectively applying traffic controls for a selected traffic type includes the step of automatically generating a table, uniquely defining traffic controls for a traffic type for said route and the step of examining said table in processing a call and selectively inhibiting the completion of calls of a type on a route identified in said tables.

3. The method in accordance with claim 2 wherein said system collects traffic measurements and wherein said step of generating said table includes the steps of adding to the table data defining traffic controls for a route only after a certain traffic condition reflected by said collected traffic measurements has persisted for a predetermined period of time, and automatically removing traffic controls from said table after traffic conditions upon which the addition of data to said table was based have ceased to exist for a predetermined period of time.

4. In a telecommunications system comprising a plurality of interconnected exchanges, a method of controlling traffic between a first and a second exchange, comprising the steps of:
   receiving in said first exchange a message from said second exchange; indicating a request to control traffic from the first exchange to the second exchange;
   generating a time control block defining a time period;
   recording a control activity bit defining call traffic control for call traffic from said first to said second exchange;
   inspecting said call activity bit each time a call is handled in said first exchange designated for said second exchange; and
   allowing a limited number of calls from said first exchange to said second exchange during a predetermined time period computed with respect to said time period of said time control block.

5. In a telecommunications system comprising a plurality of interconnected exchanges, a method of completing telephone calls from a first exchange to another exchange comprising the steps of:
   recording, for each of a plurality of routes, indices reflecting attempted calls and completed calls, on a per-route basis, wherein a route is defined as comprising all circuits connected between an exchange and one adjacent exchange;
   computing the ratio of attempted calls to completed calls for each route connected to an exchange;
   generating a list defining a plurality of routes for which a computed attempt to answer ratio falls outside a predetermined range of values;
   recording, for each call on one of the listed plurality of routes to a destination code, indices reflecting unsuccessful completion of calls to said destination code; and
   selectively restricting calls to certain destination codes on the basis of said indices reflecting unsuccessful completions.

6. The method in accordance with claim 5 wherein said step of recording indices reflecting uncompleted calls includes the steps of recording attempted calls and completed calls to a destination, computing an attempts to answer ratio for each destination code for calls on a route, setting a status bit for each destination code for which the value of the attempts to answer ratio falls outside of a predetermined range of values, and wherein said step of selectively restricting calls comprises restricting calls to each destination code for which said status bit has been set.

7. A method of computing controlling telephone traffic between exchanges in a telecommunication system comprising a plurality of interconnected exchanges, comprising the steps of obtaining indices reflecting unsuccessful attempts of calls from a first exchange to a second exchange;
  computing a value reflecting a completion rate for all calls from said first to said second exchange;
  recording, for each destination code used in calls from said first to said second exchange, indices reflecting unsuccessful attempts to reach destination codes;
  computing a value representative of the completion rate of calls for each of said destination codes; and
  selectively generating a list of destination codes to be subjected to call restriction.

8. The method in accordance with claim 7 and in a telecommunications system wherein all circuits connecting said first exchange to said second exchange are defined as a route and wherein calls may be completed from said first exchange to said second exchange by means of a direct route interconnecting said first exchange and said second exchange and by an alternate route via another exchange connected to said first exchange and to said second exchange, and wherein said step of generating a list comprises the step of computing a value indicative of the completion rate of calls on said direct route and computing a separate value indicative of the completion rate of calls on said alternate route.

9. The method in accordance with claim 7 further comprising the step of examining said value computed for said destination codes and wherein said step of generating said list destination codes to be subjected to call restriction value for said destination is executed only after said value computed for said destination codes has been found to fall outside of a predetermined range of values for a predetermined number of time intervals.

10. The method in accordance with claim 7 and further comprising the step of periodically inspecting said list and deleting an entry from said list when said entry has been in said list for more than a predetermined number of consecutive time intervals.

11. The method of completing telephone calls in a telephone exchange interconnected with each of a plurality of other exchanges via routes, wherein a route comprises a plurality of groups of interexchange transmission links, said links of each group having characteristics unique to a group, comprising the steps of:
  selecting a first choice route from a first exchange to a second exchange;
  examining a plurality of indices defining different types of controls to be applied to calls on said selected route; and
  in response to said indices selectively applying call restriction on a call on said route.

12. The method in accordance with claim 11 and further comprising the step of determining availability of said selected route and selecting an alternate route if the first selected route is not available, and further comprising the step of consulting indices pertaining to said alternate route and the step of selectively applying call restriction controls to a call on said alternate route.

13. The method in accordance with claim 11 wherein said step of applying call restriction comprises the step of allowing a predefined number of calls to be completed on a route during a predetermined time interval.

14. A method of generating call restriction control indicators comprising the step of determining the number of idle circuits in a route, wherein a route comprises all interconnecting links between a first exchange and a second exchange, and the steps of comparing the number of idle circuits against a first threshold and a second threshold and setting a first indicator when said number of idle circuits does not satisfy said first threshold and setting a second indicator when said number of idle circuits does not satisfy said second threshold;
  wherein call restriction control is invoked for a first type of traffic but not a second type of traffic if said first indicator is set and is invoked for both said first and said second type of traffic if said second indicator is set.

15. The method in accordance with claim 14 and further comprising the step of resetting said first indicator and said second indicator when said first and said second indicators have been set for more than a predetermined interval of time.

16. In a telecommunications system comprising a plurality of interconnected exchanges, the method of implementing call control in one exchange, comprising the steps of:
  computing a value representative of the percentage of circuits, in a route comprising all circuits between said one exchange and another exchange designated for handling call traffic, occupied by incoming traffic from said other exchange and transmitting a message to said other exchange requesting reduction in traffic from said other exchange on said route.

* * * * *

UNITED STATES PATENT AND TRADEMARK OFFICE
CERTIFICATE OF CORRECTION

PATENT NO. : 5,068,892

DATED : November 26, 1991

INVENTOR(S) : Konstantin Livanos

It is certified that error appears in the above-identified patent and that said Letters Patent is hereby corrected as shown below:

Column 22, claim 4, line 27, after "exchange" delete the semicolon.

Signed and Sealed this

Twenty-fifth Day of May, 1993

Attest:

MICHAEL K. KIRK

Attesting Officer

Acting Commissioner of Patents and Trademarks